United States Patent
Kubota et al.

(10) Patent No.: US 12,313,177 B2
(45) Date of Patent: May 27, 2025

(54) ELECTROMAGNETIC VALVE

(71) Applicant: KOITO MANUFACTURING CO., LTD., Tokyo (JP)

(72) Inventors: Akinobu Kubota, Shizuoka (JP); Taishi Hachiya, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 54 days.

(21) Appl. No.: 18/273,932

(22) PCT Filed: Jan. 12, 2022

(86) PCT No.: PCT/JP2022/000676
§ 371 (c)(1),
(2) Date: Jul. 24, 2023

(87) PCT Pub. No.: WO2022/158346
PCT Pub. Date: Jul. 28, 2022

(65) Prior Publication Data
US 2024/0295274 A1    Sep. 5, 2024

(30) Foreign Application Priority Data

Jan. 25, 2021 (JP) ................................ 2021-009604
Jan. 25, 2021 (JP) ................................ 2021-009605
(Continued)

(51) Int. Cl.
| F16K 27/02 | (2006.01) |
| F16K 31/06 | (2006.01) |
| F16K 41/12 | (2006.01) |

(52) U.S. Cl.
CPC ........ F16K 27/029 (2013.01); F16K 31/0624 (2013.01); F16K 41/12 (2013.01)

(58) Field of Classification Search
CPC .................................................. F16K 27/029
See application file for complete search history.

(56) References Cited

U.S. PATENT DOCUMENTS

| 5,546,987 A | 8/1996 | Sule |
| 6,684,901 B1 * | 2/2004 | Cahill ................ F16K 31/0655 |
| | | 251/291 |

(Continued)

FOREIGN PATENT DOCUMENTS

| CN | 208871085 U | 5/2019 |
| CN | 111946869 A | 11/2020 |

(Continued)

OTHER PUBLICATIONS

International Search Report (PCT/ISA/210) issued Feb. 15, 2022 from the International Searching Authority in International Application No. PCT/JP2022/000676.
(Continued)

*Primary Examiner* — Reinaldo Sanchez-Medina
(74) *Attorney, Agent, or Firm* — Sughrue Mion, PLLC

(57) ABSTRACT

An electromagnetic valve includes a flow path forming portion, and a solenoid housing. The flow path forming portion includes a first component and a second component. The solenoid housing, the first component, and the second component are arranged in this order in the axial direction. The first component is provided with a connection portion. The solenoid housing and the second component are provided with supporting portions. Each of the supporting portions includes a first lock portion. When a first end portion and a second end portion are defined on at least one of sides of the first component that is present in a cross section passing through the connection portion, the first lock portion is located on a first end portion side, and a space through which the connection portion passes is provided from the first lock portion to a second end portion side.

12 Claims, 18 Drawing Sheets

(30) Foreign Application Priority Data

| | | |
|---|---|---|
| Jan. 25, 2021 | (JP) | 2021-009606 |
| Jan. 25, 2021 | (JP) | 2021-009607 |
| Jan. 25, 2021 | (JP) | 2021-009608 |

(56) References Cited

U.S. PATENT DOCUMENTS

| | | | |
|---|---|---|---|
| 9,249,895 B2* | 2/2016 | Hettinger | F16K 31/082 |
| 9,964,220 B1* | 5/2018 | Ro | F16K 31/0675 |
| 10,544,874 B2* | 1/2020 | Hentschel | F16K 27/029 |
| 10,704,701 B1 | 7/2020 | Yu et al. | |
| 2014/0246615 A1* | 9/2014 | Volz | F16K 27/029 |
| | | | 251/129.15 |
| 2016/0096177 A1* | 4/2016 | Sugiura | F16K 11/044 |
| | | | 137/625.48 |
| 2020/0003321 A1 | 1/2020 | Xu et al. | |
| 2020/0189528 A1 | 6/2020 | Kubota et al. | |
| 2022/0144216 A1* | 5/2022 | Park | F16K 27/003 |

FOREIGN PATENT DOCUMENTS

| | | |
|---|---|---|
| EP | 3 672 030 A1 | 6/2020 |
| JP | 61-571 U | 1/1986 |
| JP | 2018-091474 A | 6/2018 |
| JP | 3222008 U | 7/2019 |
| JP | 2020-94622 A | 6/2020 |
| KR | 10-2011-0076512 A | 7/2011 |

OTHER PUBLICATIONS

Written Opinion (PCT/ISA/210) issued Feb. 15, 2022 from the International Searching Authority in International Application No. PCT/JP2022/000676.

Extended European Search Report issued Jun. 17, 2024 by the European Patent Office in European Patent Application No. 22742468.6.

Written Opinion (PCT/ISA/237) issued Feb. 15, 2022 by the International Searching Authority in International Application No. PCT/JP2022/000676.

* cited by examiner

ELECTROMAGNETIC VALVE

This is a National Phase Entry of PCT International Application No. PCT/JP2022/000676 filed on Jan. 12, 2022, which claims priority to Japanese Patent Application Nos. 2021-009604, 2021-009605, 2021-009606, 2021-009607, and 2021-009608, filed on Jan. 25, 2021, the contents of all of which are incorporated herein by reference in their entirety.

TECHNICAL FIELD

The present invention relates to an electromagnetic valve.

BACKGROUND ART

Patent Literature 1 discloses an electromagnetic valve including a solenoid, a sealing portion provided on a movable element, a first pipe, and a second pipe.

CITATION LIST

Patent Literature

Patent Literature 1: JP2020-94622A

SUMMARY OF INVENTION

Technical Problem

In the electromagnetic valve of Patent Literature 1, one component defines a flow path of a fluid in the electromagnetic valve. For example, it is not easy to change a specification of the electromagnetic valve.

In the electromagnetic valve of Patent Literature 1, a seal member that is in sliding contact with an outer peripheral surface of the movable element is provided such that the fluid does not flow to a coil side. On the other hand, since the movable element slides with respect to the seal member, electric power required to move the movable element increases.

In the electromagnetic valve of Patent Literature 1, a seal member that is in sliding contact with an outer peripheral surface of the movable element is provided such that the fluid does not flow to a coil side.

An object of a first aspect of the present invention is to provide an electromagnetic valve in which strength of a portion supporting a component can be easily ensured and a specification can be easily changed.

An object of a second aspect of the present invention is to provide an electromagnetic valve of which a specification can be easily changed.

An object of a third aspect of the present invention is to provide an electromagnetic valve capable of preventing an increase in distance between components.

An object of a fourth aspect of the present invention is to provide an electromagnetic valve capable of preventing a fluid from flowing to a coil side and capable of operating a movable element with less electric power.

An object of a fifth aspect of the present invention to provide an electromagnetic valve capable of preventing movement of a movable element from being hindered.

Solution to Problem

An electromagnetic valve according to one aspect of the present invention including:
a flow path forming portion including an inflow portion into which a fluid flows and at least one outflow portion from which the fluid flows out, in which the fluid flows;
a solenoid including a coil and a movable element capable of reciprocating in an axial direction with respect to the coil; and
a solenoid housing accommodating at least the coil, in which
the electromagnetic valve is configured to switch between, by reciprocation of the movable element, a closed state in which the fluid is prevented from flowing out of the outflow portion and an open state in which the fluid is allowed to flow out of the outflow portion,
the flow path forming portion includes a first component and a second component,
the solenoid housing, the first component, and the second component are arranged in this order in the axial direction,
the first component is provided with a connection portion that allows the fluid to flow between the flow path forming portion and an outside,
the solenoid housing and the second component are provided with supporting portions supporting each other,
each of the supporting portions includes a first lock portion extending in the axial direction and a second lock portion engaging with the first lock portion to prevent mutual displacement in the axial direction, and
when a first end portion and a second end portion located on an opposite side of the first end portion are defined on at least one of sides of the first component that is present in a cross section passing through the connection portion and extending in a direction perpendicular to the axial direction, the first lock portion is located on a first end portion side, and a space through which the connection portion passes is provided from the first lock portion to a second end portion side.

Since the first lock portion is located on at least one first end portion in the cross section passing through the connection portion and extending in the direction perpendicular to the axial direction, and the space through which the connection portion passes is provided from the first lock portion to the second end portion side, the connection portion that allows the fluid to flow between the flow path forming portion and the outside can be extended from the first component. Further, compared to a configuration in which the connection portion is sandwiched between a plurality of the first lock portions on a side on which the connection portion is provided, even when the connection portion is enlarged, a width of the first lock portion is easily ensured, and strength is easily ensured. Further, when the space provided from the first lock portion to the second end portion side is sufficiently large, the connection portion can be switched to a small or large connection portion only by replacing the first component without changing a specification of the supporting portion.

An electromagnetic valve according to one aspect of the present invention, including:
a flow path forming portion including an inflow portion into which a fluid flows and at least one outflow portion from which the fluid flows out, in which the fluid flows;

a solenoid including a coil and a movable element capable of reciprocating in an axial direction with respect to the coil; and a solenoid housing accommodating at least the coil, in which the electromagnetic valve is configured to switch between, by reciprocation of the movable element, a closed state in which the fluid is prevented from flowing out of the outflow portion and an open state in which the fluid is allowed to flow out of the outflow portion, the flow path forming portion includes a first component and a second component, and the first component and the second component form a flow path.

The electromagnetic valve includes the flow path forming portion including the first component and the second component, and the solenoid housing, and the first component and the second component forms the flow path, and thus by replacing at least one of the first component and the second component, it is possible to easily change a specification such as the number of switchable flow paths while using common portions such as the solenoid and the solenoid housing.

An electromagnetic valve according to one aspect of the present invention, including:

a flow path forming portion including an inflow portion into which a fluid flows and at least one outflow portion from which the fluid flows out, in which the fluid flows;

a solenoid including a coil and a movable element capable of reciprocating in an axial direction with respect to the coil; and a solenoid housing accommodating at least the coil, in which the electromagnetic valve is configured to switch between, by reciprocation of the movable element, a closed state in which the fluid is prevented from flowing out of the outflow portion and an open state in which the fluid is allowed to flow out of the outflow portion, the flow path forming portion includes a first component and a second component, the solenoid housing, the first component, and the second component are arranged in this order in the axial direction, an elastic member is provided between the solenoid housing and the first component, and the first component is provided so as to be movable in the axial direction relative to the solenoid housing, the solenoid housing and the second component are respectively provided with first movement restriction portions that restrict relative movement in a direction away from each other, and the first component and the second component are respectively provided with second movement restriction portions that restrict relative movement in a direction away from each other.

In the configuration in which the flow path forming portion includes the first component and the second component, and the first component is movable relative to the solenoid housing by the elastic member, the first movement restriction portions and the second movement restriction portions are provided. The first movement restriction portions restrict the relative movement of the solenoid housing and the second component in the direction away from each other, and the second movement restriction portions restrict the relative movement of the first component and the second component in the direction away from each other. Therefore, it is possible to prevent the first component from moving relative to the solenoid housing and to prevent an increase in distance between the first component and the second component.

An electromagnetic valve according to one aspect of the present invention, including:

a flow path forming portion including an inflow portion into which a fluid flows and at least one outflow portion from which the fluid flows out, in which the fluid flows; and a solenoid including a coil and a movable element capable of reciprocating in an axial direction with respect to the coil, in which the electromagnetic valve is configured to switches between, by reciprocation of the movable element, a closed state in which the fluid is prevented from flowing out of the outflow portion and an open state in which the fluid is allowed to flow out of the outflow portion, and a seal portion that expands and contracts in accordance with the reciprocation of the movable element and prevents the fluid from flowing from the flow path forming portion to the coil is provided.

By providing the seal portion, it is possible to prevent the flow of the fluid from the flow path forming portion to the coil. Further, since the seal portion extends and contracts in accordance with the reciprocation of the movable element, the movable element can be operated with less electric power than, for example, a case of using a structure in which the seal portion does not expand and contract and slides on the movable element.

An electromagnetic valve according to one aspect of the present invention, including:

a flow path forming portion including an inflow portion into which a fluid flows and at least one outflow portion from which the fluid flows out, in which the fluid flows;

a solenoid including a coil and a movable element capable of reciprocating in an axial direction with respect to the coil; and a solenoid housing accommodating at least the coil, in which the electromagnetic valve is configured to switch between, by reciprocation of the movable element, a closed state in which the fluid is prevented from flowing out of the outflow portion and an open state in which the fluid is allowed to flow out of the outflow portion, the movable element is capable of reciprocating in the axial direction through an opening provided in the solenoid housing, a seal portion configured to prevent the fluid from flowing into the solenoid housing from the flow path forming portion is provided between the movable element and the opening, and the solenoid housing includes a communication passage that allows gas to flow between an inside and an outside thereof.

In the electromagnetic valve in which the seal portion is provided between the movable element and the opening to prevent the fluid from flowing into the solenoid housing from the flow path forming portion, the solenoid housing includes the communication passage that allows the gas to flow between the inside and the outside thereof, and it is possible to prevent movement of the movable element from being hindered by a pressure difference between the inside and outside of the solenoid housing.

Advantageous Effects of Invention

According to the first aspect of the present invention, it is possible to provide an electromagnetic valve in which strength of a portion supporting a component can be easily ensured and a specification can be easily changed.

According to the second aspect of the present disclosure, it is possible to provide an electromagnetic valve of which a specification can be easily changed.

According to the third aspect of the present disclosure, it is possible to provide an electromagnetic valve capable of preventing an increase in distance between components.

According to the fourth aspect of the present invention, it is possible to provide an electromagnetic valve capable of preventing a fluid from flowing to a coil side and operating a movable element with less electric power.

According to the fifth aspect of the present disclosure, it is possible to provide an electromagnetic valve capable of preventing movement of a movable element from being hindered.

DESCRIPTION OF EMBODIMENTS

Figure 1:
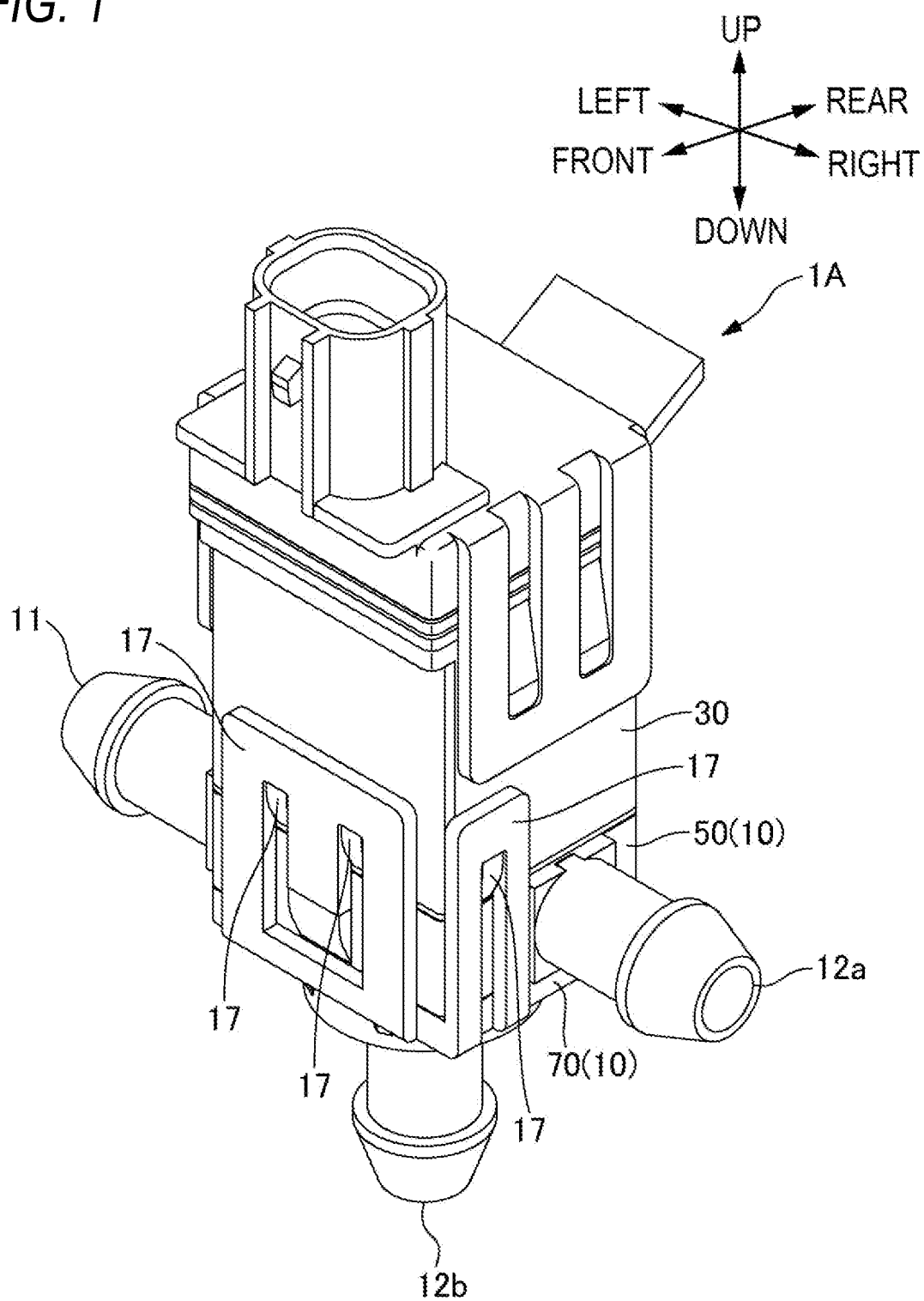
FIG. 1 is a perspective view of an electromagnetic valve according to a first embodiment.

Hereinafter, embodiments of the present invention will be described with reference to the drawings. Members having the same reference numerals as those already described in the description of the present embodiment will be omitted for convenience of description. Further, for convenience of description, the dimensions of the members shown in the drawings may be different from actual dimensions of the members.

First Embodiment

Figure 2:
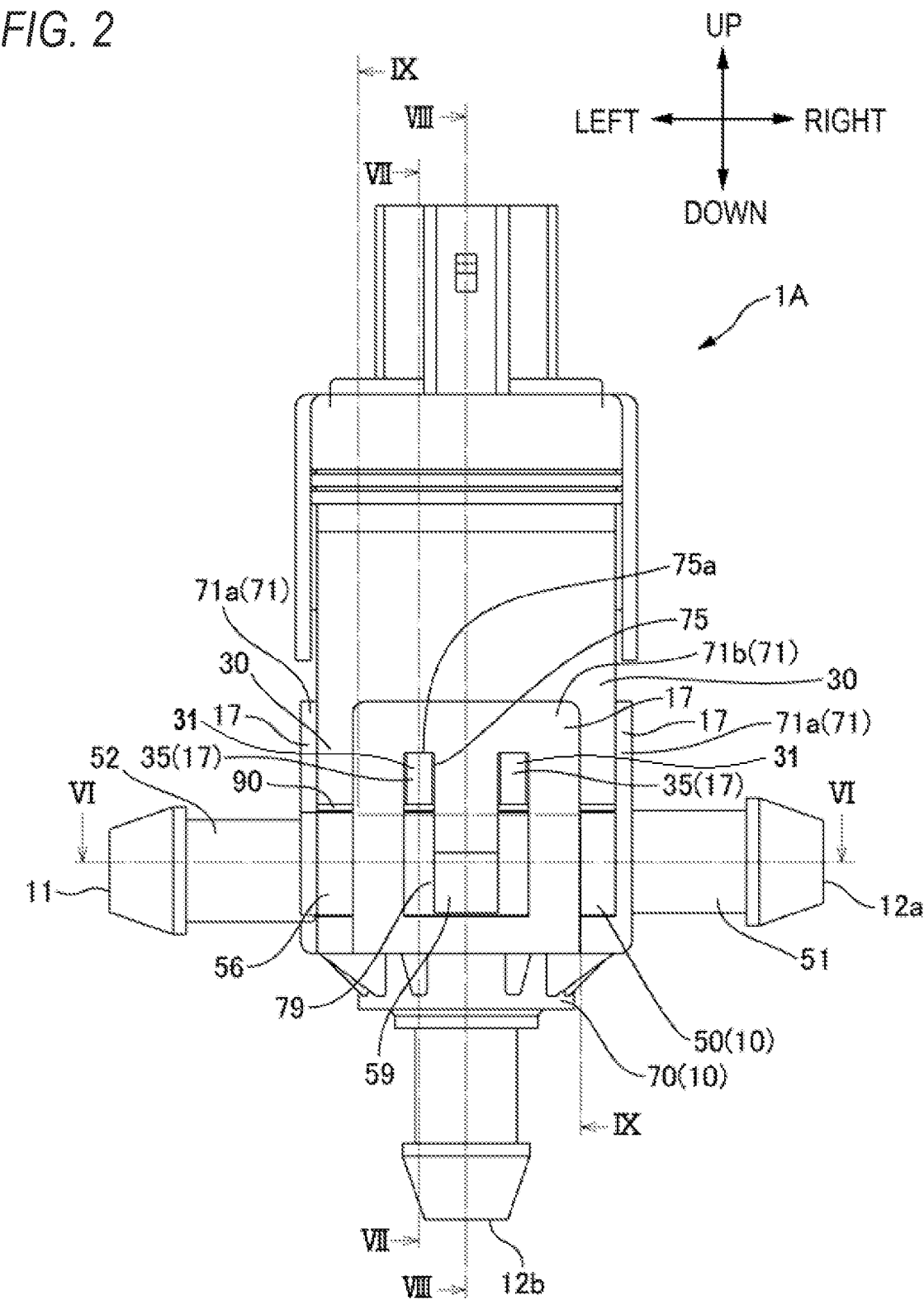
FIG. 2 is a front view of the electromagnetic valve according to the first embodiment.
Figure 3:
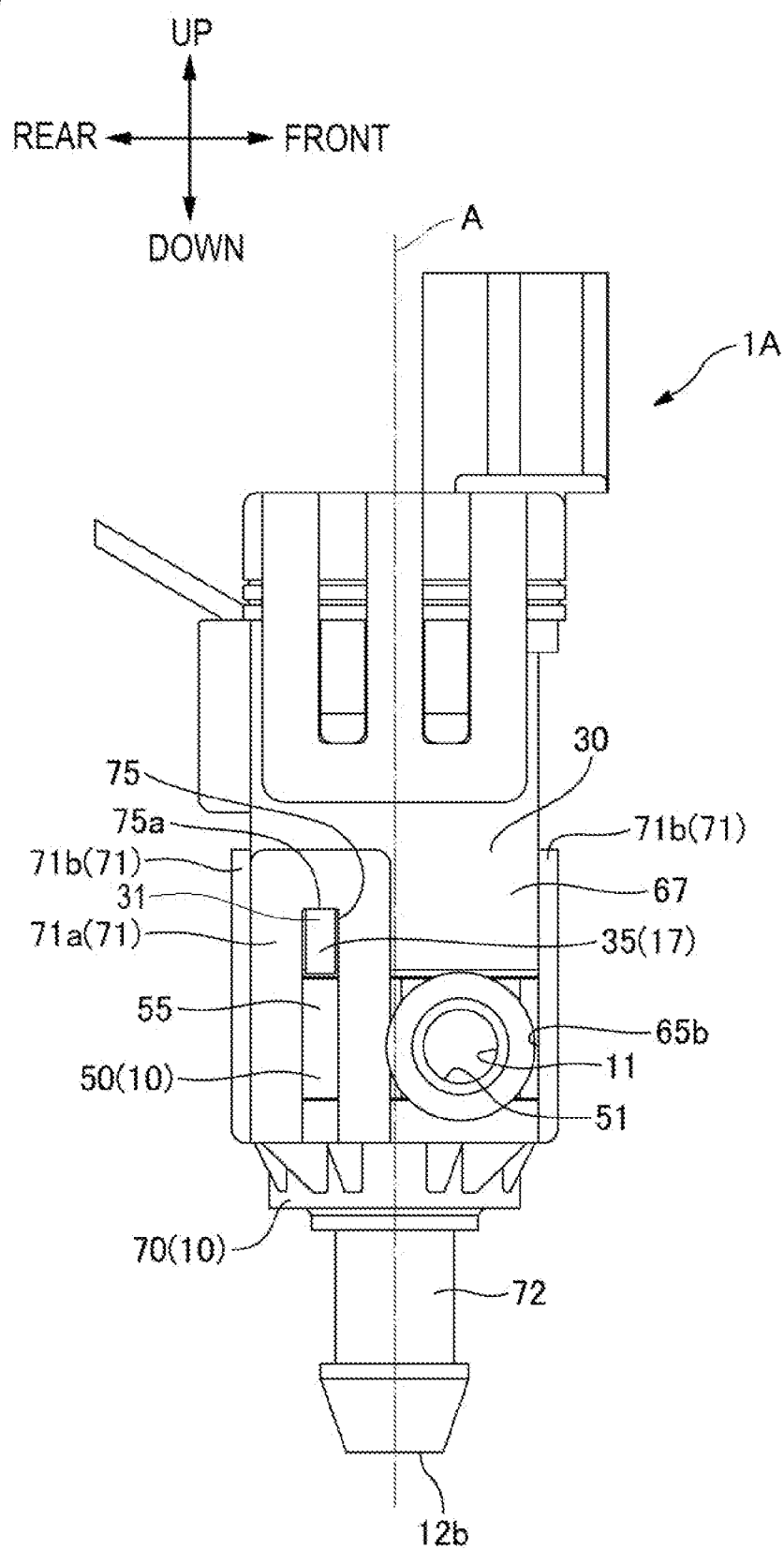
FIG. 3 is a left side view of the electromagnetic valve according to the first embodiment.
Figure 4:
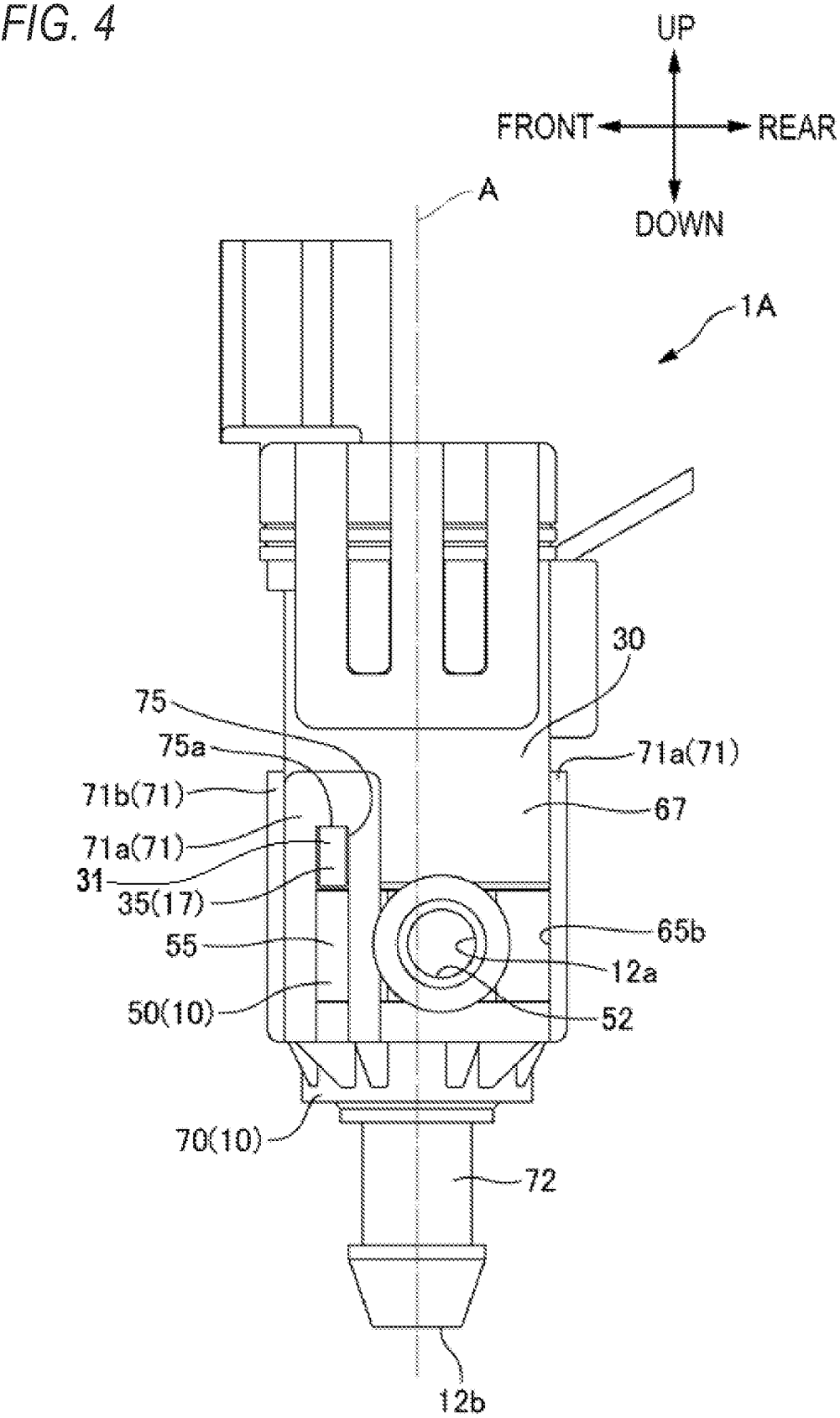
FIG. 4 is a right side view of the electromagnetic valve according to the first embodiment.
Figure 5:
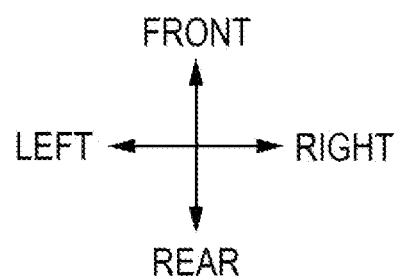
FIG. 5 is a bottom view of the electromagnetic valve according to the first embodiment.
Figure 5:
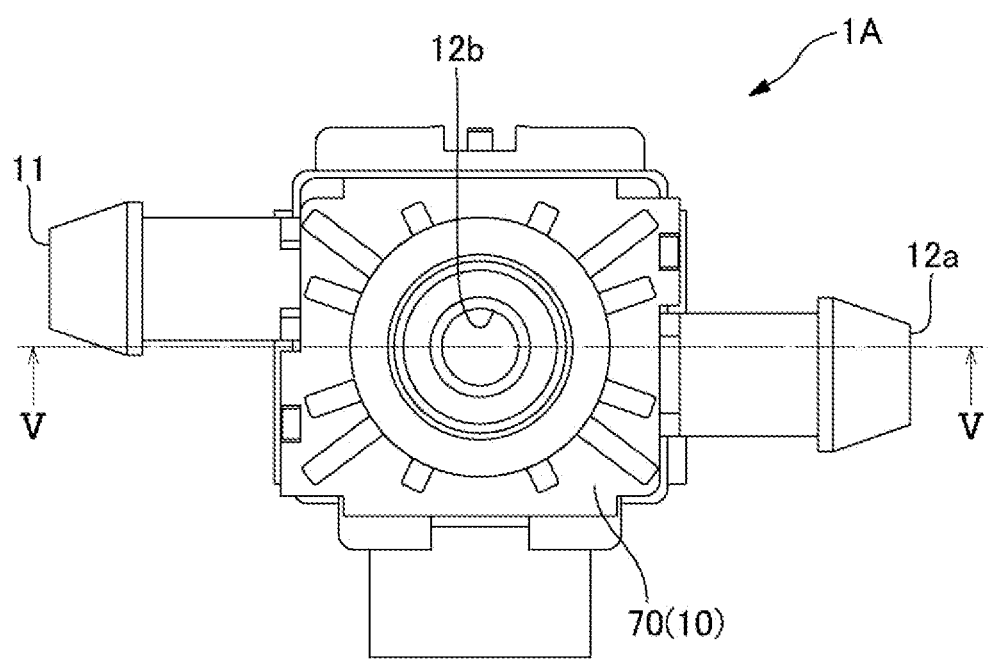
Figure 6:
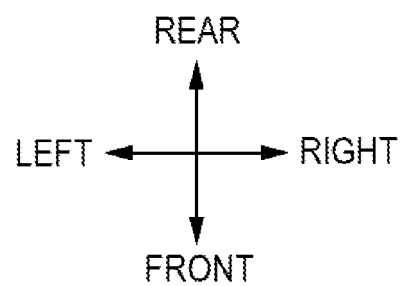
FIG. 6 is a cross-sectional view taken along an arrow direction of a line VI-VI in FIG. 2.
Figure 6:
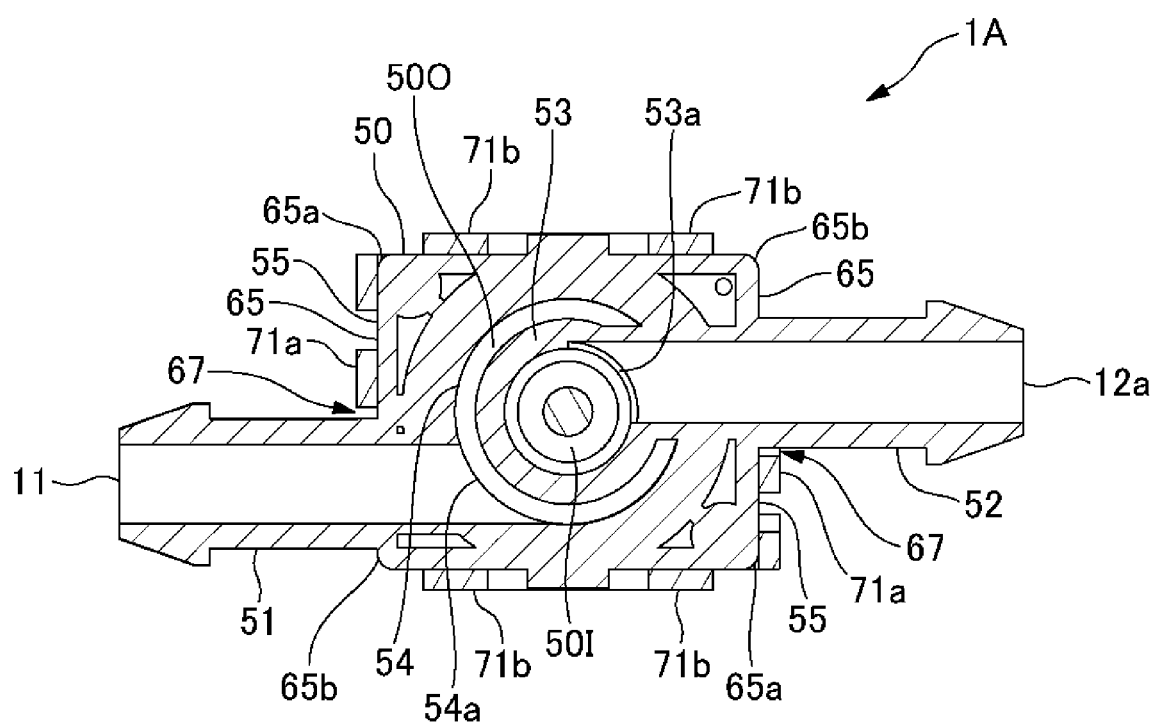
Figure 7:
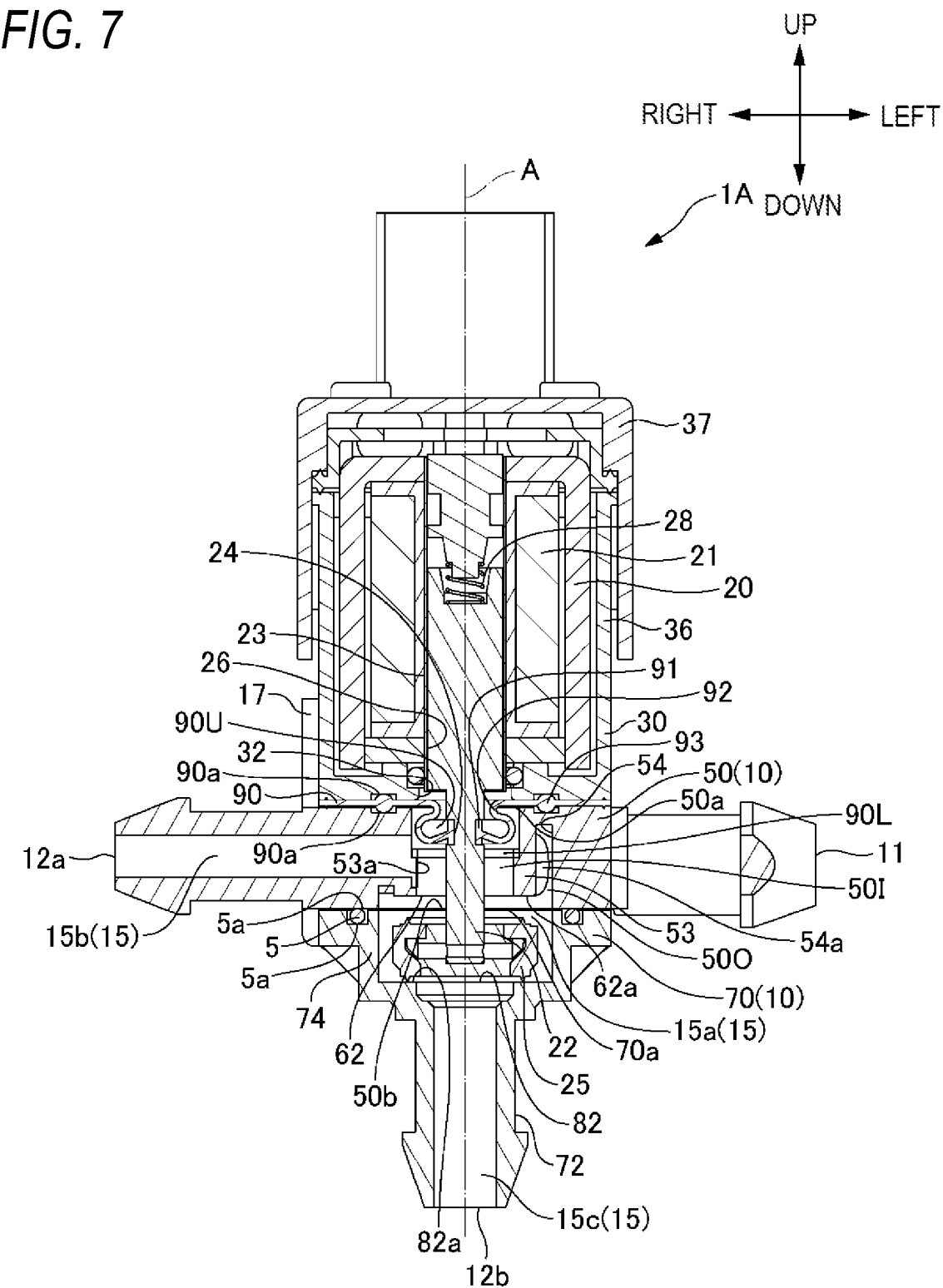
FIG. 7 is a cross-sectional view taken along an arrow direction of a line V-V in FIG. 5 in a first state.

FIG. 1 is a perspective view of an electromagnetic valve 1A according to a first embodiment. FIG. 2 is a front view of the electromagnetic valve 1A. FIG. 3 is a left side view of the electromagnetic valve 1A. FIG. 4 is a right side view of the electromagnetic valve 1A. FIG. 5 is a bottom view of the electromagnetic valve 1A. FIG. 6 is a cross-sectional view of the electromagnetic valve 1A taken along an arrow direction of a line VI-VI in FIG. 2. FIG. 7 is a cross-sectional view of the electromagnetic valve 1A in a first state to be described later, which is taken along an arrow direction of a line V-V in FIG. 5. The electromagnetic valve 1A is mounted, for example, on a cleaner that cleans a vehicle lamp which is mounted on a vehicle, an on-vehicle sensor, or a windshield of the vehicle. Alternatively, the electromagnetic valve 1A is mounted on a cleaner that cleans a monitoring camera. Alternatively, the electromagnetic valve 1A is mounted on a cleaner that cleans a sensor that is attached to a structure provided on ground such as a traffic light or a street light and acquires traffic information. Examples of the sensor to be cleaned include a camera, a LiDAR, and a radar. LiDAR is an abbreviation of light detection and ranging or laser imaging detection and ranging.

As shown in FIG. 7, the electromagnetic valve 1A includes a flow path forming portion 10 and a solenoid 20. The flow path forming portion 10 includes an inflow portion 11 into which a fluid flows, a first outflow portion 12a from which the fluid flows out, and a second outflow portion 12b. The solenoid 20 includes a coil 21, a movable element 22, and a biasing member 28. The movable element 22 can reciprocate along an axial direction.

When the coil 21 is not energized (when the solenoid 20 is not energized), the movable element 22 is pressed toward the flow path forming portion 10 by an elastic restoring force of the biasing member 28. When the coil 21 is energized (the solenoid 20 is energized), the movable element 22 moves toward the coil 21 against the elastic restoring force of the biasing member 28.

In the following description, each direction is defined based on an axial direction in which a movement axis A of the movable element 22 extends. A coil 21 side in the axial direction is referred to as an upper side. A flow path forming portion 10 side in the axial direction is referred to as a lower side. Further, a direction orthogonal to the axial direction is referred to as a radial direction, and a rotation direction around the axial direction is referred to as a circumferential direction. Further, front, rear, left, and right directions are defined provisionally as shown in each figure.

The electromagnetic valve 1A can be switched between a first state and a second state by reciprocation of the movable element 22. In the first state, the fluid is allowed to flow out from the first outflow portion 12a, and is prevented from flowing out from the second outflow portion 12b. In the second state, the fluid is allowed to flow out from the second outflow portion 12b, and is prevented from flowing out from the first outflow portion 12a.

As shown in FIG. 7, the electromagnetic valve 1A includes a solenoid housing 30 that accommodates at least the coil 21. The solenoid housing 30 includes an accommodating portion 36 that accommodates at least the coil 21, and a sealing member 37 that seals an upper side of the accommodating portion 36. The solenoid housing 30 is provided with an opening 32 that opens downward. The movable element 22 extends to an outside of the solenoid housing 30 through the opening 32. A guide portion 26 that guides the movable element 22 in the axial direction is disposed in the solenoid housing 30. The guide portion 26 is in contact with a guided portion 23 provided on the movable element 22.

The flow path forming portion 10 includes a first component 50 and a second component 70. The first component 50 and the second component 70 constitute a flow path 15 that guides the fluid from the inflow portion 11 to the first outflow portion 12a and the second outflow portion 12b.

The solenoid housing 30, the first component 50, and the second component 70 are arranged in this order from above to below in the axial direction. In the illustrated example, a seal portion 90 that is an elastic member is provided between the solenoid housing 30 and the first component 50. The seal portion 90 is pressed by pressing portions 90a provided on the solenoid housing 30 and the first component 50, respectively.

The solenoid housing 30 and the second component 70 are provided with supporting portions 17 that support each other. The supporting portions 17 support the solenoid housing 30 and the second component 70 with the first component 50 interposed therebetween in a manner of not being displaceable in the axial direction.

An O-ring 5 is provided between the first component 50 and the second component 70. Each of the first component 50 and the second component 70 is provided with a pressing portion 5a that presses the O-ring 5 in the axial direction.

The first component 50 includes an upper opening 50a adjacent to the opening 32 of the solenoid housing 30 with the seal portion 90 interposed therebetween, and a lower opening 50b adjacent to the second component 70. The movable element 22 extending outward from the opening 32 of the solenoid housing 30 is inserted into the first component 50 through the upper opening 50a of the first component 50.

As shown in FIG. 6, the first component 50 has a rectangular shape when viewed in the axial direction. The first component 50 includes the inflow portion 11 and the first outflow portion 12a. As shown in FIGS. 3, 4, and 6, the first component 50 is provided with a pair of first side surfaces 55 facing each other. A first connection portion 51 is provided on one first side surface 55. A second connection portion 52 is provided on the other first side surface 55. The first connection portion 51 is connected to the inflow portion 11. The second connection portion 52 is connected to the first outflow portion 12a. The first connection portion 51 and the second connection portion 52 are tubular portions extending leftward and rightward from the first side surface 55, respectively.

As shown in FIG. 7, the first component 50 is provided with a first opening 62 and a partition portion 53. The first opening 62 is bordered by a contact portion 62a that is in contact with an opening and closing portion 25 provided at a tip of the movable element 22. The partition portion 53 extends downward from above. As shown in FIGS. 6 and 7, the partition portion 53 partitions a space inside the first component 50 constituting a part of the flow path 15 into an inner space 50I and an outer space 50O in the radial direction. The partition portion 53 is connected to the upper opening 50a and the first opening 62. The inner space 50I and the outer space 50O are connected to each other via a lower side of the partition portion 53. The movable element 22 extends in the inner space 50I. The partition portion 53 is provided with a flow hole 53a that connects the inner space 50I and an internal space of the second connection portion 52.

The first component 50 includes an enclosure portion 54 that defines an outer peripheral edge of the outer space 50O. The enclosure portion 54 is connected to the lower opening 50b. The enclosure portion 54 is provided with a flow hole 54a that connects the outer space 50O and an internal space of the first connection portion 51.

The second component 70 includes the second outflow portion 12b. The second component 70 is provided with a third connection portion 72 connected to the second outflow portion 12b. The third connection portion 72 is a tubular portion extending in the axial direction. The second component 70 has an upper opening 70a adjacent to the lower opening 50b of the first component 50. The second component 70 is provided with a second opening 82 bordered by a contact portion 82a that can come into contact with the opening and closing portion 25 of the movable element 22. The third connection portion is connected to the second opening 82. The second component 70 includes an enclosure portion 74 that defines an internal space of the second component 70 that forms a part of the flow path 15. The enclosure portion 74 is connected to the upper opening 70a and the second opening 82. The enclosure portion 74 has a larger diameter than the second opening 82. The first component 50 and the second component 70 are adjacent to each other with the O-ring 5 interposed therebetween such that an outer edge of the flow path 15 is formed by the enclosure portion 54 of the first component 50 and the enclosure portion 74 of the second component 70. When the electromagnetic valve 1A is in either the first state or the second state, the opening and closing portion 25 of the movable element 22 is located between the first component 50 and the second component 70. Specifically, the opening and closing portion 25 is located between the first opening 62 and the second opening 82.

The seal portion 90 is an elastic member that expands and contracts in accordance with the reciprocation of the movable element 22 and prevents the fluid from flowing from the flow path forming portion 10 to the coil 21. The seal portion 90 is provided to partition the movable element 22 and the opening 32 of the solenoid housing 30. The seal portion 90 includes a first fitting portion 91 fixed to the movable element 22 and a second fitting portion 93 fixed to the flow path forming portion 10. The first fitting portion 91 is fixed to a groove portion 24 provided in the movable element 22. The second fitting portion 93 is also fixed to the solenoid housing 30. The first fitting portion 91 and the second fitting portion 93 are each formed in a frame shape. The first fitting portion 91 and the second fitting portion 93 are connected to each other by a bent portion 92. The first fitting portion 91 is smaller in size in the radial direction than the second fitting portion 93, and is provided inside the second fitting portion 93. In the present embodiment, the first fitting portion 91 and the second fitting portion 93 are each formed in a circular shape (see FIG. 12 to be described later), and a diameter of the first fitting portion 91 is smaller than a diameter of the second fitting portion 93.

The first fitting portion 91 may be directly fixed to the movable element 22, or may be indirectly fixed to the movable element 22 via another member fixed to the movable element 22. Similarly, the second fitting portion 93 may be directly or indirectly fixed to the first component 50 forming the flow path forming portion 10. Further, the second fitting portion 93 may be directly or indirectly fixed to the solenoid housing 30 of which a positional relationship with respect to the flow path forming portion 10 does not change. In this description, the expression "fixed to the flow path forming portion 10" means that it is fixed such that a position thereof relative to the flow path forming portion 10 is not changed. Further, in the present description, the expression "fixed to the solenoid housing 30" means that it is fixed such that a position thereof relative to the solenoid housing 30 is not changed. In the present embodiment, the seal portion 90 includes a sheet-shaped portion and a tubular portion provided at a center of the sheet-shaped portion and extending vertically from the sheet-shaped portion. The first fitting portion 91 is provided in the tubular portion, and the second fitting portion 93 is provided in the sheet-shaped portion.

The first fitting portion 91 is in surface contact with the movable element 22. Specifically, a flat portion 91a extending in an axial direction of the first fitting portion 91 is fitted into the groove portion 24 of the movable element 22 to achieve the surface contact. The second fitting portion 93 is fixed to the flow path forming portion 10 by being sandwiched between the solenoid housing 30 and the flow path forming portion 10. Specifically, the second fitting portion 93 is pressed by the pressing portion 90a of the solenoid housing 30 and the pressing portion 90a of the first component 50. The second fitting portion 93 is fixed outward of the opening 32 of the solenoid housing 30 and the upper opening 50a of the first component 50, in the radial direction. The second fitting portion 93 has a thickness in the axial direction larger than that of another portion of the seal portion 90.

The seal portion 90 separates a space 90U on the coil 21 side from a space 90L on the flow path 15 side. The guided portion 23 of the movable element 22 is provided at a portion located in the space 90U. The flow path 15 is defined by the seal portion 90, the first component 50, and the second component 70. The flow path 15 includes a first flow path 15a, a second flow path 15b, and a third flow path 15c. The first flow path 15a refers to a flow path from the inflow portion 11 to the first opening 62 of the first component and the second opening 82 of the second component. The second flow path 15b refers to a flow path from the first opening 62 of the first component to the first outflow portion 12a. The third flow path 15c refers to a flow path from the second opening 82 of the second component to the second outflow portion 12b.

Next, an operation of the electromagnetic valve 1A will be described. The first state of the electromagnetic valve 1A illustrated in FIG. 7 is a state in which the coil 21 is not energized, the movable element 22 is pushed out by the biasing member 28, and the opening and closing portion 25 comes into contact with the contact portion 82a of the second component 70 to close the second opening 82. In the first state, the opening and closing portion 25 is not in contact with the contact portion 62a of the first component 50, and the first opening 62 is in an open state. That is, in the first state, the fluid is allowed to flow from the first flow path 15a to the second flow path 15b through the first opening 62, and the fluid is allowed to flow out from the first outflow portion 12a. On the other hand, in the first state, flow of the fluid to the third flow path 15c via the second opening 82 and outflow of the fluid from the second outflow portion 12b are prevented.

Figure 8:
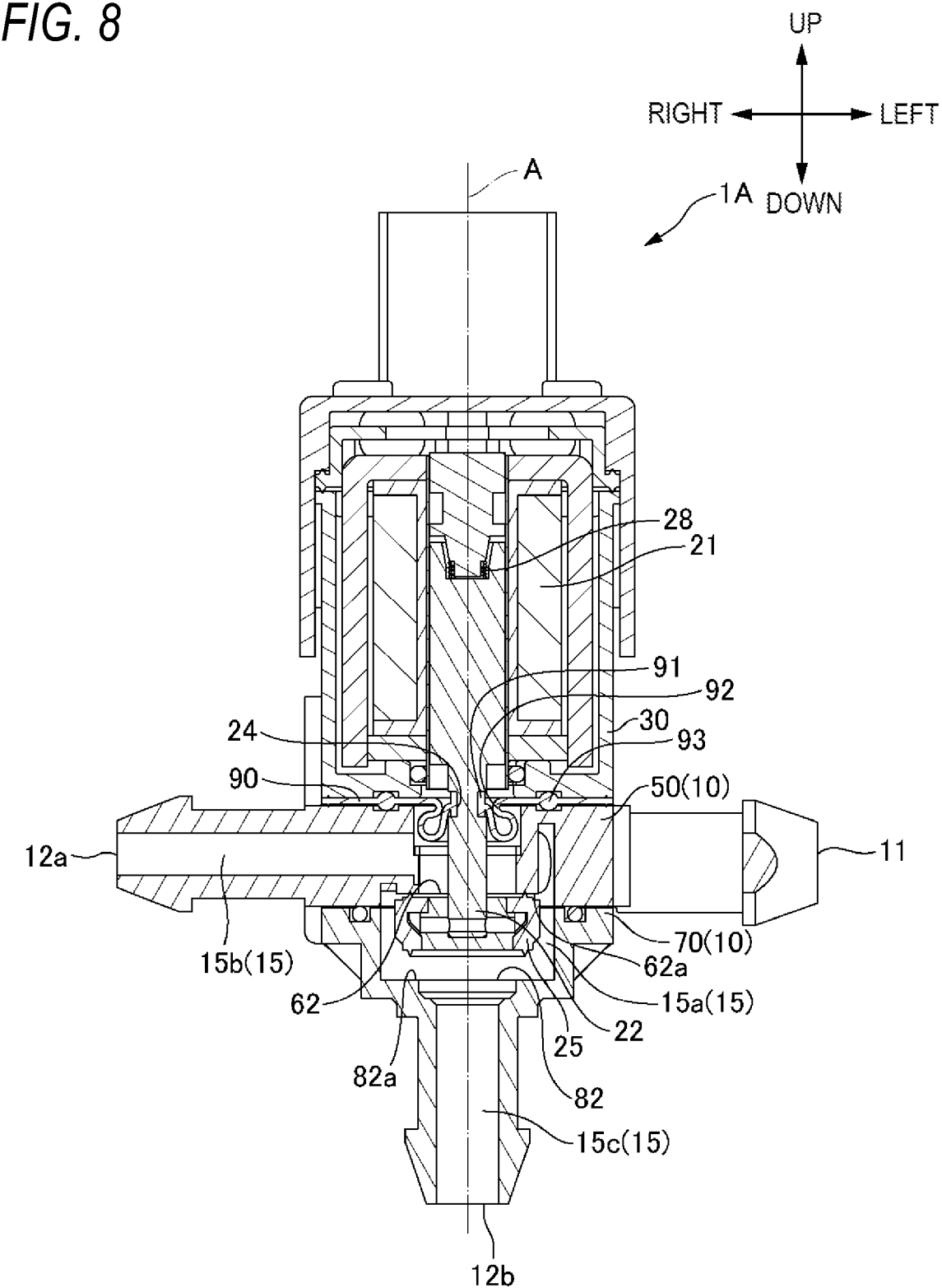
FIG. 8 is a cross-sectional view taken along the arrow direction of the line V-V in FIG. 5 in a second state.

FIG. 8 is a cross-sectional view of the electromagnetic valve 1A in a second state, which is taken along the arrow direction of the line V-V in FIG. 5. The second state of the electromagnetic valve 1A illustrated in FIG. 8 is a state in which the coil 21 is energized, the movable element 22 is attracted to the coil 21 side, the opening and closing portion 25 comes into contact with the contact portion 62a of the first component 50 to close the first opening 62. In the second state, the opening and closing portion 25 is not in contact with the contact portion 82a of the second component 70, and the second opening 82 is in an open state. That is, in the second state, the fluid is allowed to flow from the first flow path 15a to the third flow path 15c through the second opening 82, and the fluid is allowed to flow out from the second outflow portion 12b. On the other hand, in the second state, flow of the fluid to the second flow path 15b via the first opening 62 and outflow of the fluid from the first outflow portion 12a are prevented.

When the electromagnetic valve 1A transitions from the first state to the second state (transitions from FIG. 7 to FIG. 8), the bent portion 92 of the seal portion 90 is deformed, and the movable element 22 is attracted toward the coil 21. When the electromagnetic valve 1A transitions from the second state to the first state (when the electromagnetic valve 1A transitions from FIG. 8 to FIG. 7), the bent portion 92 of the seal portion 90 returns to an original shape, and the movable element 22 is pushed out to a flow path forming portion 10 side.

Figure 9:
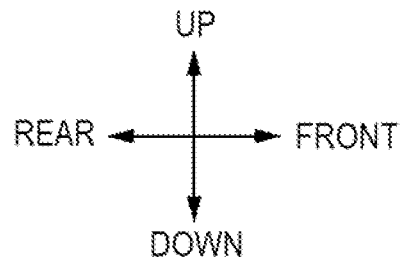
FIG. 9 is a cross-sectional view taken along an arrow direction of a line VII-VII in FIG. 2 in the first state.
Figure 9:
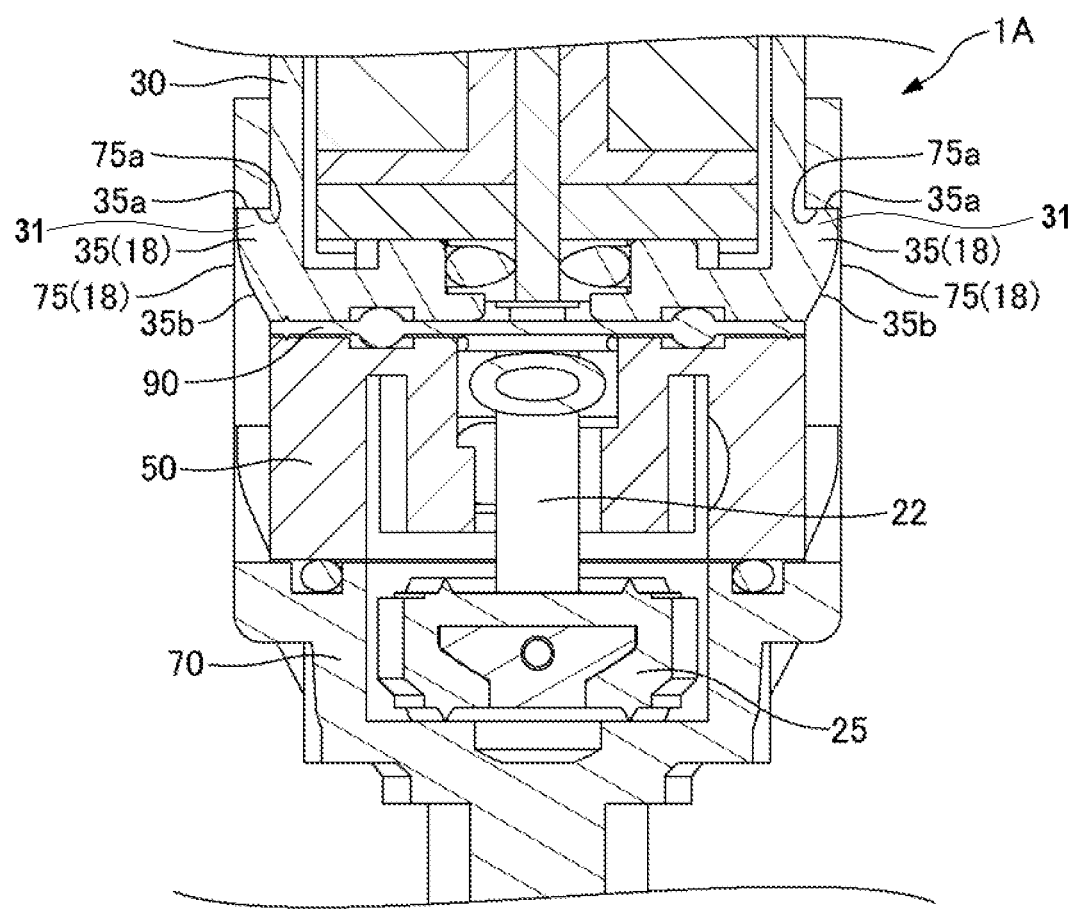
Figure 10:
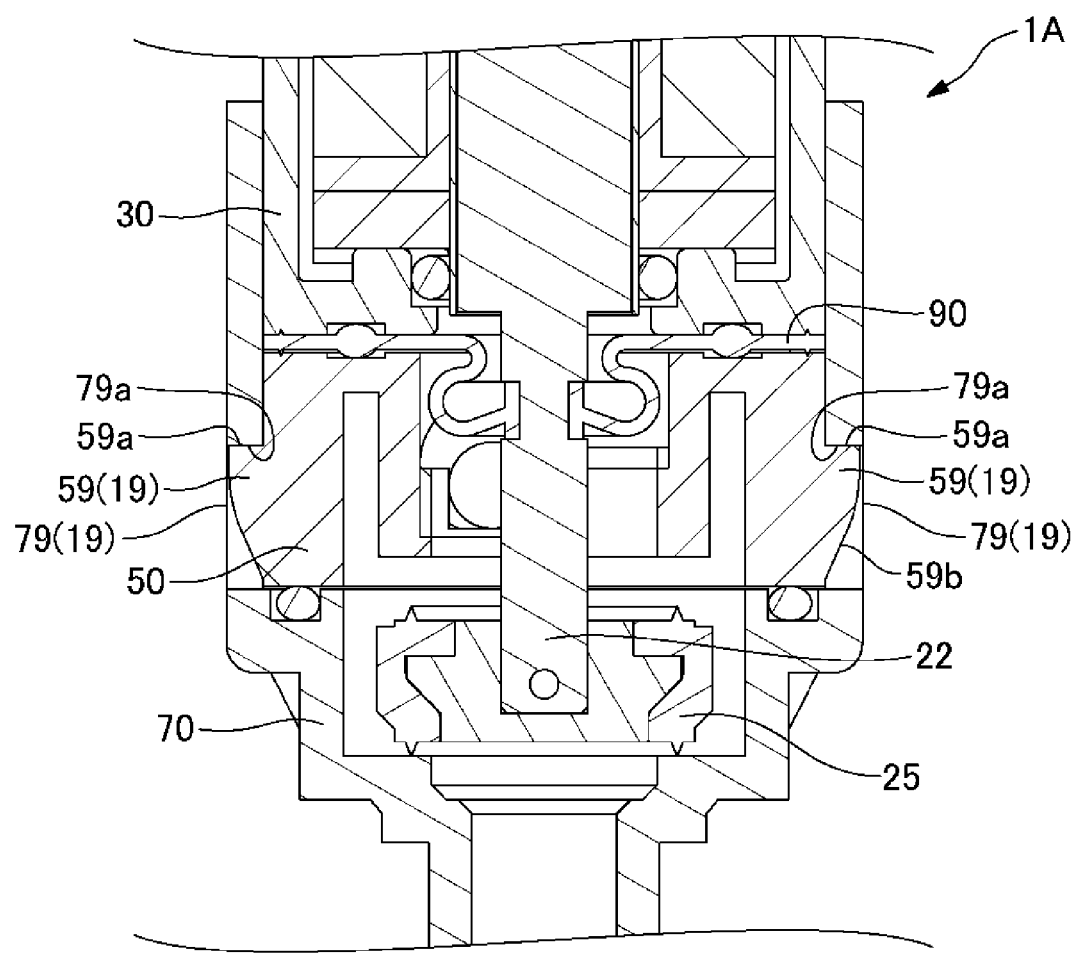
FIG. 10 is a cross-sectional view taken along an arrow direction of a line VIII-VIII in FIG. 2 in the first state.

Next, the supporting portion 17 provided on the solenoid housing 30 and the second component 70 will be described with reference to FIGS. 2 to 4, 9, and 10. FIG. 9 is a cross-sectional view of the electromagnetic valve 1A in the first state, which is taken along an arrow direction of a line VII-VII in FIG. 2. FIG. 10 is a cross-sectional view of the electromagnetic valve 1A in the first state, which is taken along an arrow direction of a line VIII-VIII in FIG. 2. As shown in FIGS. 2 to 4, the supporting portion 17 includes a first lock portion 71 provided on the second component 70 and a second lock portion 31 provided on the solenoid housing 30. The first lock portion 71 is a portion extending in the axial direction. The second lock portion 31 engages with the first lock portion 71 to restrict mutual displacement in the axial direction.

The first lock portion 71 includes first lock portions 71a and 71b. The first lock portions 71a extend in the axial direction from a side surface of the second component 70 along the first side surface 55 of the first component 50 provided with the first connection portion 51 and the other first side surface 55 of the first component 50 provided with the second connection portion 52. The first lock portion 71b extends in the axial direction from a side surface of the second component 70 along a pair of facing second side surfaces 56 of the first component 50 adjacent to the first side surfaces 55. A width of the first lock portion 71b is larger than a width of the first lock portion 71a. The first lock portions 71a and 71b each include a first accommodating portion 75 capable of accommodating a first protrusion 35 to be described later. The first accommodating portion 75 includes a first abutted surface 75a that abuts against a first abutting surface 35a to be described later.

The second lock portion 31 is provided on a side surface of the solenoid housing 30 along a direction in which the first lock portions 71a and 71b extend. As shown in FIG. 9, the second lock portion 31 includes the first protrusion 35. The first protrusion 35 is accommodated in the first accommodating portions 75 of the first lock portions 71a and 71b, and thus the solenoid housing 30 and the second component 70 support each other. The first protrusion 35 includes the first abutting surface 35a and a first inclined surface 35b. The first abutted surface 75a, the first abutting surface 35a, and the first inclined surface 35b are arranged in this order in the axial direction. The first inclined surface 35b is inclined so as to protrude from the side surface of the solenoid housing 30 toward the first abutting surface 35a along the axial direction. The first abutting surface 35a extends in a direction perpendicular to the axial direction. The first abutting surface 35a abuts against the first abutted surface 75a to restrict relative movement of the solenoid housing 30 and the second component 70 in a direction in which the solenoid housing 30 and the second component 70 are separated from each other. That is, the first protrusion 35 of the solenoid housing 30 and the first accommodating portion 75 of the second component 70 constitute a first movement restriction portion 18 that restricts the relative movement of the solenoid housing 30 and the second component 70 in the direction in which the solenoid housing 30 and the second component 70 are separated from each other. The first movement restriction portion 18 defines a maximum separation distance between the solenoid housing 30 and the second component 70.

As described above, the seal portion 90 that is the elastic member is provided between the solenoid housing 30 and the first component 50 (FIG. 7). Therefore, when the seal portion 90 is compressed, a distance between the solenoid housing 30 and the first component 50 is reduced by an amount of compression. That is, the first component 50 is movable in the axial direction relative to the solenoid housing 30. Therefore, in the present embodiment, a mechanism is provided to restrict the first component 50 from moving in the axial direction relative to the solenoid housing 30. As shown in FIGS. 2 and 10, the first lock portion 71b extending along the second side surface 56 of the first component 50 includes a second accommodating portion 79 capable of accommodating a second protrusion 59. The second accommodating portion 79 includes a second abutted surface 79a that abuts against a second abutting surface 59a.

As shown in FIGS. 2 and 10, the first component 50 includes the second protrusion 59. The second protrusion 59 is accommodated in the second accommodating portion 79 of the first lock portion 71b. The second protrusion 59 includes the second abutting surface 59a and a second inclined surface 59b. The second abutted surface 79a, a second abutting surface 39a, and a second inclined surface 39b are arranged in this order in the axial direction. The second inclined surface 39b is inclined so as to protrude from the second side surface 56 of the first component 50 toward the second abutting surface 59a along the axial direction. The second abutting surface 59a extends in a direction perpendicular to the axial direction. The second abutting surface 59a abuts against the second abutted surface 79a to restrict relative movement of the first component 50 and the second component 70 in a direction in which the first component 50 and the second component 70 are separated from each other. That is, the second protrusion 59 of the first component 50 and the second accommodating portion 79 of the second component 70 constitute a second movement restriction portion 19 that restricts the relative movement of the first component 50 and the second component 70 in a direction in which the first component 50 and the second component 70 are separated from each other. Although the first component 50 is provided so as to be movable in the axial direction relative to the solenoid housing 30, the second movement restriction portion 19 restricts the relative movement of the first component 50 and the second component 70 in the direction in which the first component 50 and the second component 70 are separated from each other. The first movement restriction portion 18 and the second movement restriction portion 19 are not disposed on the same straight line in the axial direction.

Next, the first connection portion 51 and the second connection portion 52 provided on the first component 50, and the first lock portion 71a extending along the first side surface 55 of the first component 50 will be described with reference to FIGS. 3, 4, and 6. FIG. 6 is a cross section extending in the direction perpendicular to the axial direction through the first connection portion 51 or the second connection portion 52. At least one of sides 65 of the first component 50 appearing in this cross section defines a first end portion 65a and a second end portion 65b opposite the first end portion 65a. At this time, the first lock portion 71a is located on a first end portion 65a side, and a space 67 through which the first connection portion 51 or the second connection portion 52 passes is provided from the first lock portion 71a to a second end portion 65b side.

As shown in FIG. 6, when viewed in the axial direction, the pair of first lock portions 71a are disposed at positions facing each other along a direction in which a diagonal line of the first component 50 extends. Further, as shown in FIG. 6, the first lock portions 71a are respectively disposed on the pair of first side surfaces 55 facing each other of the first component 50. As shown in FIGS. 3 and 4, when viewed from the first side surface 55 side on which the first connection portion 51 or the second connection portion 52 is provided, the first lock portion 71a is located on one side with respect to the movement axis A of the movable element 22, and the first lock portion 71a is not located on the other side. Further, the space 67 provided on the second end portion 65b side from the first lock portion 71a is opened toward the solenoid housing 30 in the axial direction.

Figure 11:
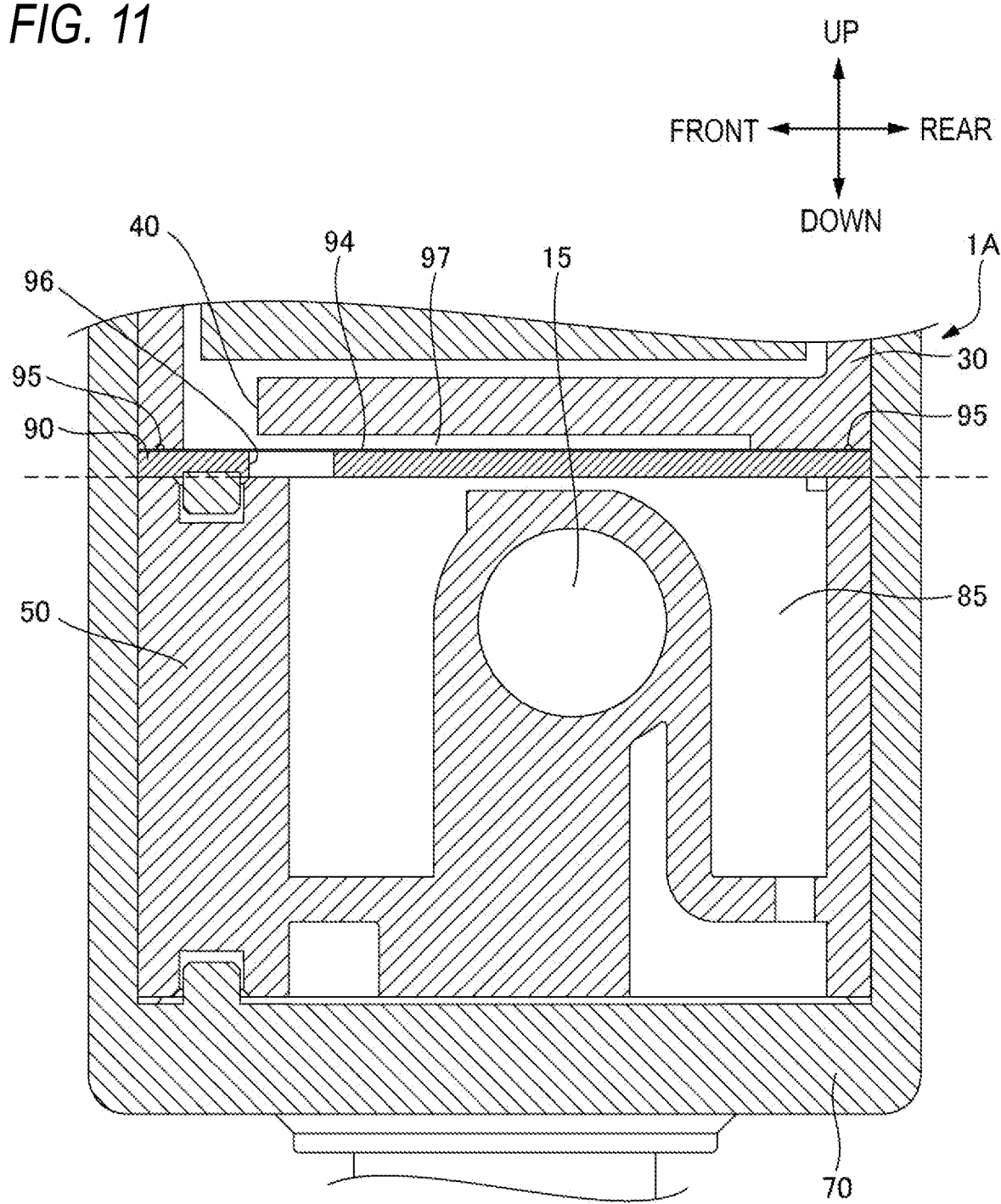
FIG. 11 is a cross-sectional view taken along an arrow direction of a line IX-IX in FIG. 2.
Figure 12:
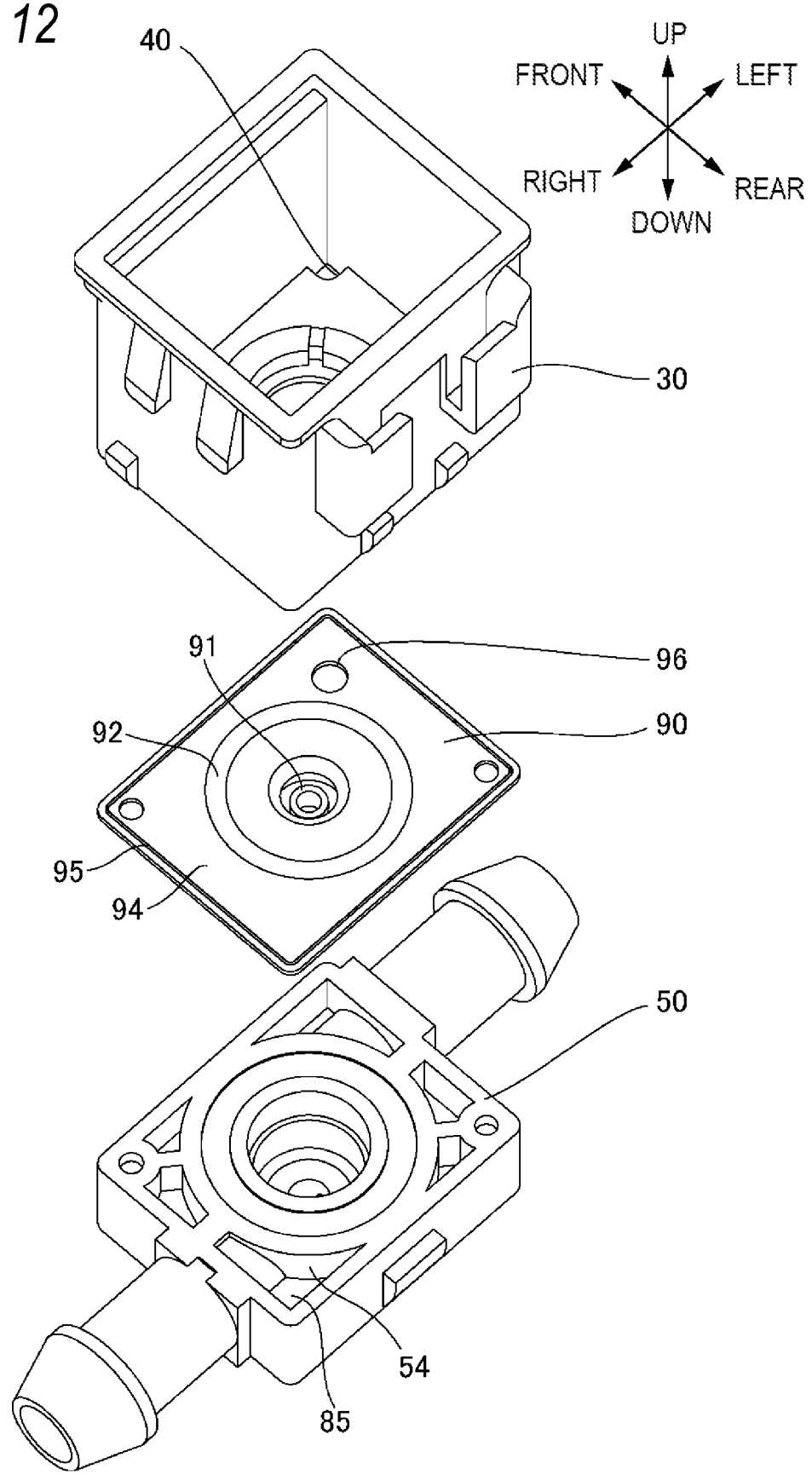
FIG. 12 is an exploded perspective view of a solenoid housing, a seal portion, and a first component.

Next, a ventilation mechanism of the solenoid housing 30 of the electromagnetic valve 1A will be described with reference to FIGS. 11 and 12. FIG. 11 is a cross-sectional view of the electromagnetic valve 1A taken along an arrow direction of a line IX-IX in FIG. 2. FIG. 12 is an exploded perspective view of the solenoid housing 30, the seal portion 90, and the first component 50. As shown in FIGS. 11 and 12, the solenoid housing 30 includes a communication passage 40 that allows gas to flow between an inside and an outside thereof. The communication passage 40 opens on a surface of the solenoid housing 30 facing the flow path forming portion 10. The communication passage 40 opens at a position farther from the first fitting portion 91 of the seal portion 90 than the second fitting portion 93 in the radial direction orthogonal to the axial direction.

The seal portion 90 includes a sheet portion 94 extending outward from the second fitting portion 93 in the radial direction. The seal portion 90 includes a third fitting portion 95 having a frame shape fixed to the solenoid housing 30. The third fitting portion 95 is thicker than the sheet portion 94 in the axial direction. The third fitting portion 95 is fixed by being sandwiched between the solenoid housing 30 and the first component 50. The third fitting portion 95 is provided so as to border the sheet portion 94, and prevents the air from flowing through a gap between the solenoid housing 30 and the first component 50 to a region inside the third fitting portion 95.

The sheet portion 94 has a smaller thickness in the axial direction than the second fitting portion 93 and the third fitting portion 95, and a gap is present between the sheet portion 94 and the solenoid housing 30. The communication passage 40 opens in the sheet portion 94 between the second fitting portion 93 and the third fitting portion 95 in the radial direction orthogonal to the axial direction. The seal portion 90 is located between the second fitting portion 93 and the third fitting portion 95, and has a through hole 96 that causes a space partitioned by the seal portion 90 where the solenoid housing 30 is located to communicate with an outside of the space. The through hole 96 is provided in the sheet portion 94. In an example shown in FIGS. 11 and 12, the communication passage 40 and the through hole 96 overlap each other when viewed from the axial direction, but the communication passage 40 and the through hole 96 may not overlap each other when viewed from the axial direction.

A liquid storing portion 97 is formed in a space between the solenoid housing 30 and the sheet portion 94 between the second fitting portion 93 and the third fitting portion 95 of the seal portion 90. The liquid storing portion 97 is a portion that can store a liquid when the liquid enters a space on a solenoid housing 30 side with respect to the seal portion 90 from the through hole 96. Even if the liquid enters the through hole 96, the liquid can be stored in the liquid storing portion 97, and the liquid is prevented from immediately entering the communication passage 40.

The second fitting portion 93 and the third fitting portion 95 are fixed by being sandwiched between the solenoid housing 30 and the first component 50, and are also fixed to the flow path forming portion 10. The first component 50 of the flow path forming portion 10 includes a ventilation portion 85 that allows the gas to flow from an outside thereof to the through hole 96 of the sheet portion 94. The ventilation portion 85 is provided outside the enclosure portion 54 of the first component 50, and is a space that does not interfere with the flow path 15. The ventilation portion 85 also allows the gas to flow to the first component 50 from a gap which is present outside the O-ring 5 between the first component 50 and the second component 70, in the radial direction.

Operation and Effect of First Aspect

In the electromagnetic valve 1A, the first lock portion 71a is located at least one first end portion 65a of the side 65 appearing in the cross section extending through the first connection portion 51 or the second connection portion 52 in the direction perpendicular to the axial direction, and the space 67 through which the first connection portion 51 or the second connection portion 52 passes is provided from the first lock portion 71a to the second end portion 65b side. Therefore, the first connection portion 51 and the second connection portion 52 that allow the fluid to flow between the flow path forming portion 10 and an outside thereof can be extended from the first component 50. Further, compared to a configuration in which the first connection portion 51 or the second connection portion 52 is sandwiched by the plurality of first lock portions 71a on the side 65 on which the first connection portion 51 or the second connection portion 52 is provided, even when the first connection portion 51 or the second connection portion 52 is enlarged, the width of the first lock portion 71a is easily ensured, and strength is easily ensured. Further, when the space 67 provided from the first lock portion 71a to the second end portion 65b side is sufficiently large, switching to the small or large first connection portion 51 or second connection portion 52 can be performed by only replacing the first component 50 without changing a specification of the supporting portion 17.

According to the electromagnetic valve 1A, by disposing the pair of first lock portions 71a at the positions facing each other along the direction in which the diagonal lines of the first component 50 extend, the solenoid housing 30 and the second component 70 can support each other with the first component 50 interposed therebetween in a state in which bias is little, and an occurrence of gaps between the members can be prevented.

The second flow path 15b and the third flow path 15c, which are switched between an open state and a closed state, are located on the movement axis A of the movable element 22 of the electromagnetic valve 1A. In the electromagnetic valve 1A, when viewed from the first side surface 55 side on which the first connection portion 51 or the second connection portion 52 of the first component 50 is provided, the first lock portion 71a is located on one side with respect to the movement axis A of the movable element 22, and is not located on the other side. Therefore, the first connection portion 51 or the second connection portion 52 can be extended from the first component 50 near the flow path 15 on the movement axis A via the space 67 in which the first lock portion 71a is not located.

According to the electromagnetic valve 1A, since the space 67 provided on the second end portion 65b side from the first lock portion 71a is open to the solenoid housing 30 side, the first connection portion 51 or the second connection portion 52 can be easily disposed in the axial direction, and the solenoid housing 30, the first component 50, and the second component 70 can be easily assembled.

Operation and Effect of Second Aspect

The electromagnetic valve 1A includes the flow path forming portion 10 including the first component 50 and the second component 70, and the solenoid housing 30, and the flow path 15 is formed by the first component 50 and the second component 70. Therefore, by replacing at least one of the first component 50 and the second component 70, it is possible to easily change a specification such as the number of switchable flow paths while using common portions such as the solenoid 20 and the solenoid housing 30. Detailed modifications will be described in a second embodiment to a fourth embodiment to be described later, but for example, an arrangement, the number and a size of the inflow portions and the outflow portions can be easily changed. Further, a specification of the electromagnetic valve such as a normally open electromagnetic valve and a normally closed electromagnetic valve can be easily changed.

As described above, according to the electromagnetic valve 1A, many components can be used in common, and by changing only components according to specifications, a production process can be used in common.

According to the electromagnetic valve 1A, since the solenoid housing 30 and the second component 70 support each other with the first component 50 interposed therebetween by the supporting portions 17 provided in the solenoid housing 30 and the second component 70, respectively, the electromagnetic valve 1A can be easily disassembled by releasing the support of the supporting portions 17, and the specification can be easily changed.

In the electromagnetic valve 1A, the supporting portion 17 of the solenoid housing 30 includes the first protrusion 35, the supporting portion 17 of the second component 70 includes the first accommodating portion 75 capable of accommodating the first protrusion 35, and the solenoid housing 30 and the second component 70 support each other by accommodating the first protrusion 35 in the first accommodating portion 75. For example, by moving the first accommodating portion 75 outward in the radial direction, the first accommodating portion 75 does not accommodate the first protrusion 35, so that the electromagnetic valve 1A can be disassembled and the specification thereof can be easily changed.

According to the electromagnetic valve 1A, since the opening and closing portion 25 is provided between the first component 50 and the second component 70 which can be disassembled, it is easy to assemble the electromagnetic valve 1A. Further, since the opening and closing portion 25 is provided between the first component 50 and the second component 70, the first component 50 and the second component 70 are easily replaced, and the specification of the electromagnetic valve 1A is easily changed. Further, at least one of the first component 50 and the second component 70 is provided with an opening bordered by a contact portion that can come into contact with the opening and closing portion 25, so that at least one opening can be opened and closed by the opening and closing portion 25, and the flow path can be switched.

In the first embodiment, the inflow portion 11 is provided in the first component 50, and the first outflow portion 12a and the second outflow portion 12b are provided in each of the first component 50 and the second component 70. On the other hand, as in the fourth embodiment to be described later, the inflow portion may be provided in the second component. Further, as in the second embodiment to the fourth embodiment to be described later, the outflow portion may be provided in one of the first component and the second component.

In the first embodiment, the first opening 62 and the second opening 82 are provided in the first component 50 and the second component 70, respectively, and the opening and closing portion 25 is located between the first opening 62 and the second opening 82. Accordingly, the flow of the fluid to the two flow paths can be switched. On the other hand, as in the second embodiment to the fourth embodiment to be described later, one of the first component and the second component may be provided with the opening bordered by the contact portion that can come into contact with the opening and closing portion.

Operation and Effect of Third Aspect

In the electromagnetic valve 1A, the flow path forming portion 10 includes the first component 50 and the second component 70, and the first component 50 is movable relative to the solenoid housing 30 by the seal portion 90 which is the elastic member. According to the electromagnetic valve 1A, the solenoid housing 30 and the second component 70 are provided with the first movement restriction portions 18 that restrict the relative movement in the direction away from each other, and the first component 50 and the second component 70 are provided with the second movement restriction portions 19 that restrict the relative movement in the direction away from each other, and thus it is possible to prevent the first component 50 from moving relative to the solenoid housing 30 and to prevent an increase in distance between the first component 50 and the second component 70.

In the electromagnetic valve 1A, the seal portion 90, which is the elastic member, is prevented by the pressing portions 90a of the solenoid housing 30 and the first component 50, and the fluid is prevented from flowing from the flow path forming portion 10 to the coil 21 side. Further, although the O-ring 5 is provided between the first component 50 and the second component 70, the distance between the first component 50 and the second component 70 is short in a portion other than the pressing portions 5a that press the O-ring 5. Therefore, the first component 50 and the solenoid housing 30 are prevented from relatively moving in the direction away from each other.

According to the electromagnetic valve 1A, the first movement restriction portion 18 and the second movement restriction portion 19 are not disposed on the same straight line in the axial direction, and thus, for example, the first protrusion 35 can be sandwiched and supported by the first accommodating portion 75 in the direction perpendicular to the axial direction.

Operation and Effect of Fourth Aspect

According to the electromagnetic valve 1A, since the seal portion 90 is provided, it is possible to prevent the flow of the fluid from the flow path forming portion 10 side to the coil 21 side. Since the seal portion 90 extends and contracts in accordance with the reciprocation of the movable element 22, the movable element 22 can be operated with less electric power than, for example, a structure in which the seal portion 90 does not expand and contract and slides on the movable element 22.

The seal portion 90 includes the first fitting portion 91 fixed to the movable element 22 and the second fitting portion 93 fixed to the flow path forming portion 10, and thus the seal portion 90 can expand and contract along with the reciprocation of the movable element 22, and the flow of the fluid from the flow path forming portion 10 side to the coil 21 side can be prevented.

According to the electromagnetic valve 1A, since the first fitting portion 91 is in surface contact with the movable element 22, it is possible to further prevent the fluid from flowing from the flow path forming portion 10 side to the coil 21 side.

According to the electromagnetic valve 1A, the second fitting portion 93 of the seal portion 90 is sandwiched between the solenoid housing 30 and the flow path forming portion 10. Accordingly, the seal portion 90 can be firmly fixed with a simple structure.

According to the electromagnetic valve 1A, since the guided portion 23 of the movable element 22 is provided in a portion located in a space on the coil 21 side in a space separated by the seal portion 90, it is possible to prevent the fluid from flowing from the flow path forming portion 10 side to the guided portion 23 of the movable element 22.

According to the electromagnetic valve 1A, the flow of the fluid is switched between the first outflow portion 12a and the second outflow portion 12b, and the flow of the fluid from the flow path forming portion 10 side to the coil 21 side can be prevented by providing the seal portion 90.

Operation and Effect of Fifth Aspect

In the electromagnetic valve 1A in which the seal portion 90 is provided between the movable element 22 and the opening 32 to prevent the fluid from flowing into the solenoid housing 30 from the flow path forming portion 10, the solenoid housing 30 includes the communication passage 40 that allows the flow of the gas between the inside and the outside thereof, and it is possible to prevent the movement of the movable element 22 from being hindered by a pressure difference between the inside and outside of the solenoid housing 30.

According to the electromagnetic valve 1A, since the communication passage 40 opens at the position farther from the first fitting portion 91 than the second fitting portion 93 in the direction orthogonal to the axial direction, it is possible to take external gas into the solenoid housing 30 while the seal portion 90 provided between the movable element 22 and the opening 32 prevents the gas from flowing into the solenoid housing 30 from the flow path forming portion 10.

According to the electromagnetic valve 1A, since the seal portion 90 includes the third fitting portion 95 having the frame shape fixed to the solenoid housing 30, it is possible to further prevent dust, water, or the like from entering the solenoid housing 30 from the outside through the communication passage 40.

According to the electromagnetic valve 1A, since the seal portion 90 has the through hole 96 between the second fitting portion 93 and the third fitting portion 95, the gas can be circulated between the space partitioned by the seal portion 90 where the solenoid housing 30 is located and the outside of the space, and the gas can be further circulated to the communication passage 40 of the solenoid housing 30.

In the electromagnetic valve 1A, if the communication passage 40 and the through hole 96 are not overlapped with each other as viewed in the axial direction, even if the dust, the water, or the like enters, through the through hole 96, the space partitioned by the seal portion 90 where the solenoid housing 30 is located from the outside, it is possible to prevent the dust, the water, or the like from suddenly entering the inside of the solenoid housing 30 through the communication passage 40.

According to the electromagnetic valve 1A, the liquid storing portion 97 is formed in a space between the solenoid housing 30 and a portion between the second fitting portion 93 and the third fitting portion 95 of the seal portion 90. Therefore, even if the liquid enters, through the through hole 96, the space partitioned by the seal portion 90 where the solenoid housing 30 is located, the liquid is stored in the liquid storing portion 97, and thus it is possible to prevent the liquid from entering the solenoid housing 30 via the communication passage 40. Further, by setting an arrangement of the communication passage 40 or the through hole 96 in consideration of a fitting direction of the electromagnetic valve 1A, it is possible to suitably prevent the liquid from entering the solenoid housing 30.

According to the electromagnetic valve 1A, since the flow path forming portion 10 includes the ventilation portion 85 that allows the flow of the gas from the outside thereof to the through hole 96, the external gas can be taken into the solenoid housing 30 through the ventilation portion 85, the through hole 96, and the communication passage 40, and the dust, the water, and the like can be further prevented from entering the solenoid housing 30 through the communication passage 40.

Second Embodiment

Figure 13:
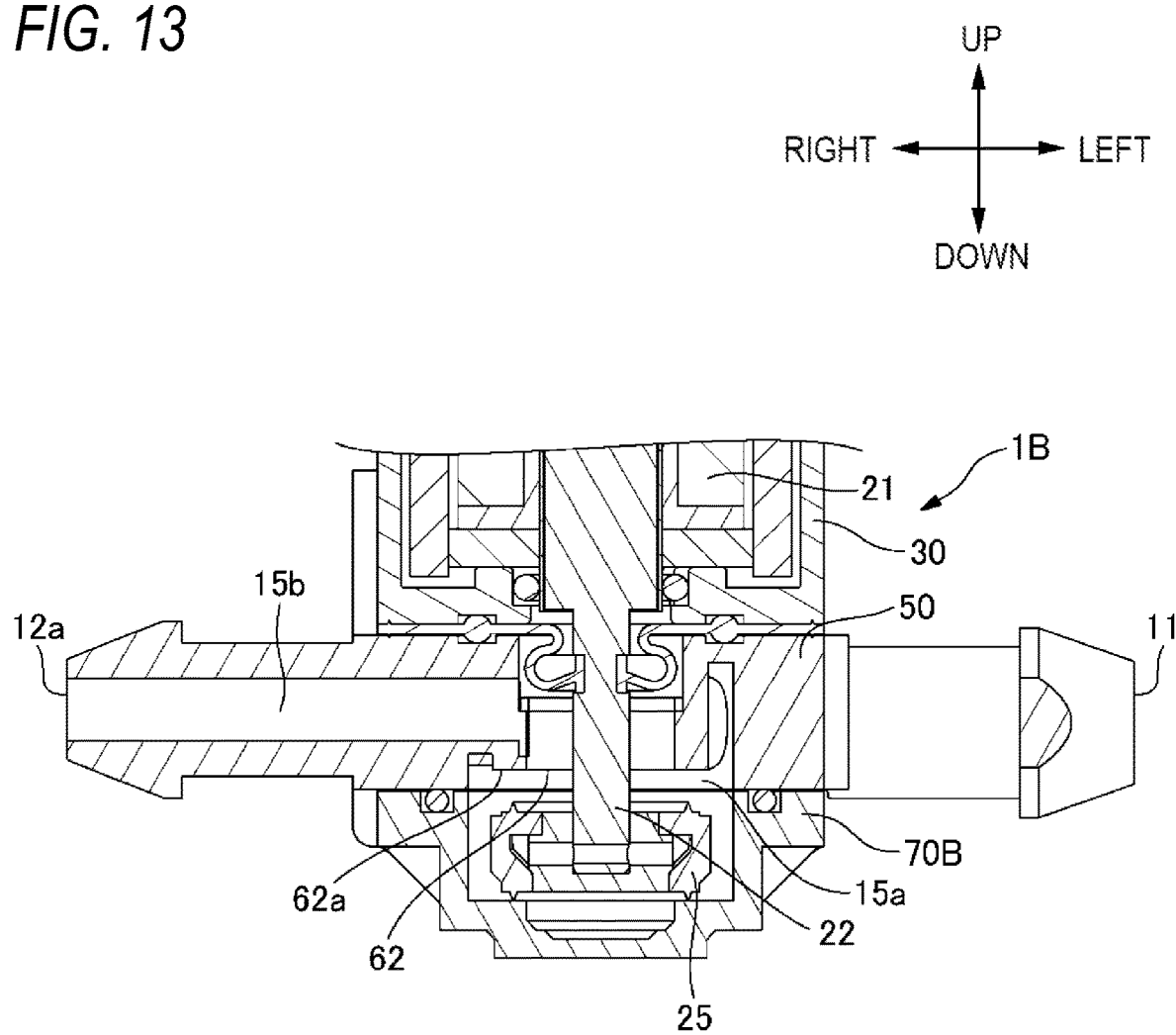
FIG. 13 is a partial cross-sectional view of an electromagnetic valve according to a second embodiment.

Next, a configuration of an electromagnetic valve 1B according to a second embodiment will be described with reference to FIG. 13. FIG. 13 is a partial cross-sectional view of the electromagnetic valve 1B. The electromagnetic valve 1B is different from the electromagnetic valve 1A according to the first embodiment in the second component 70. Therefore, in the following description, portions different from those of the electromagnetic valve 1A will be mainly described, and a description of common portions will be appropriately omitted.

A second component 70B of the electromagnetic valve 1B does not include the second outflow portion 12b and the third connection portion 72 of the electromagnetic valve 1A. Therefore, in the electromagnetic valve 1B, the third flow path 15c in the electromagnetic valve 1A is not formed. In a case in which the electromagnetic valve 1B is in an open state when power is not supplied, the opening and closing portion 25 does not contact the contact portion 62a of the first component 50, and the first opening 62 is opened. That is, in the open state, a fluid is allowed to flow from the first flow path 15a to the second flow path 15b through the first opening 62, and the fluid is allowed to flow out from the first outflow portion 12a. On the other hand, in a closed state in which the electromagnetic valve 1B is energized, the movable element 22 is attracted toward the coil 21, and the opening and closing portion 25 comes into contact with the contact portion 62a of the first component 50 to close the first opening 62. That is, in the closed state, the flow of the fluid to the second flow path 15b via the first opening 62 and the outflow of the fluid from the first outflow portion 12a are prevented.

As described above, a specification of an electromagnetic valve can be easily changed from a method of switching between two flow paths to a method of switching ON/OFF of fluid supply to one flow path only by changing the second component 70 in the electromagnetic valve 1A according to the first embodiment. The electromagnetic valve 1B is configured as a normally open electromagnetic valve. Further, components other than the second component 70 in the electromagnetic valve 1A according to the first embodiment can be used as they are. Further, the operations and effects described in the first embodiment are similarly exhibited in the second embodiment as long as the operations and effects do not contradict with those of the electromagnetic valve 1B.

Third Embodiment

Figure 14:
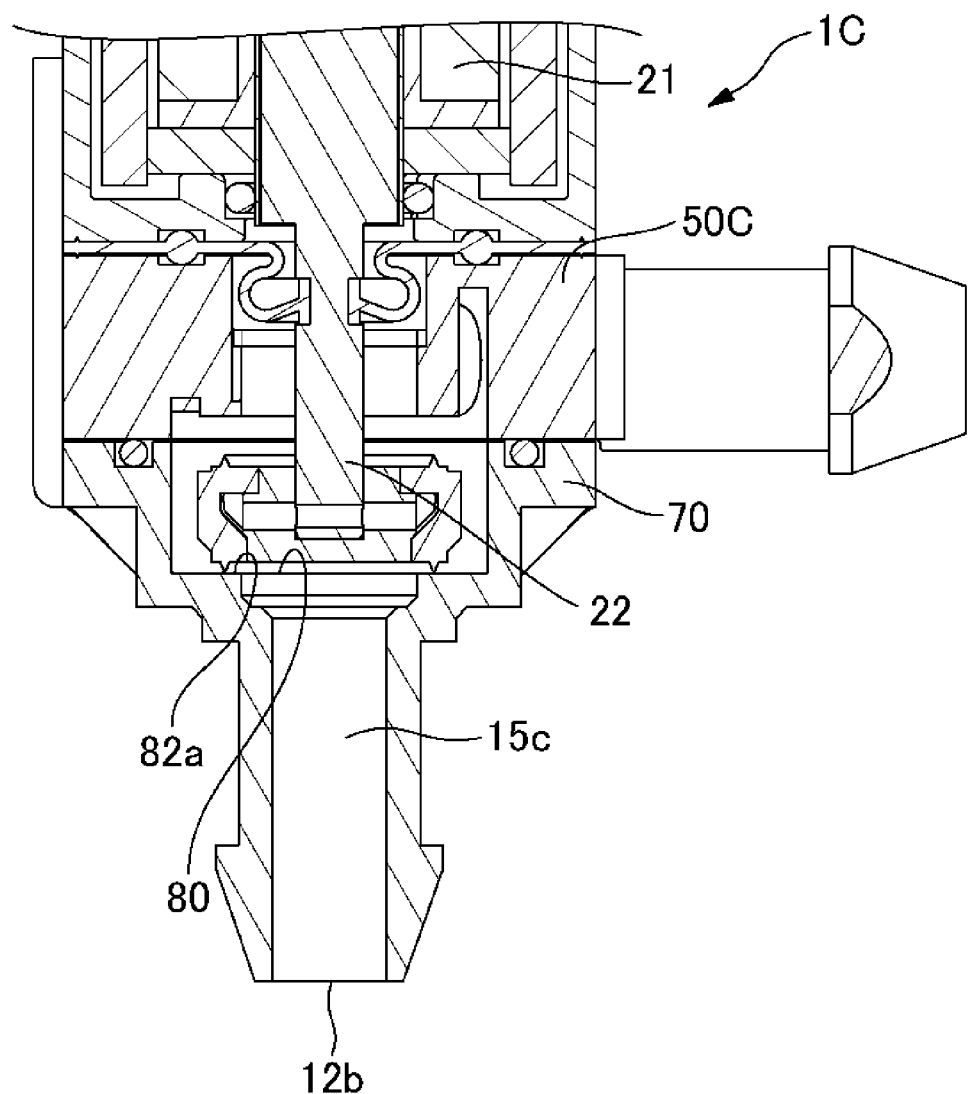
FIG. 14 is a partial cross-sectional view of an electromagnetic valve according to a third embodiment.

Next, a configuration of an electromagnetic valve 1C according to a third embodiment will be described with reference to FIG. 14. FIG. 14 is a partial cross-sectional view of the electromagnetic valve 1C. The electromagnetic valve 1C is different from the electromagnetic valve 1A according to the first embodiment in the first component 50. Therefore, in the following description, portions different from those of the electromagnetic valve 1A will be mainly described, and a description of common portions will be appropriately omitted.

A first component 50C of the electromagnetic valve 1C does not include the first outflow portion 12a and the second connection portion 52 of the electromagnetic valve 1A. Therefore, in the electromagnetic valve 1C, the second flow path 15b in the electromagnetic valve 1A is not formed. In a case in which the electromagnetic valve 1C is in a closed state when power is not supplied, the movable element 22 is pushed out by a biasing member, and the opening and closing portion 25 comes into contact with the contact portion 82a of the second component 70 to close the second opening 82. That is, in the closed state, flow of a fluid to the third flow path 15c via the second opening 82 and outflow of the fluid from the second outflow portion 12b are prevented. On the other hand, in an open state in which the electromagnetic valve 1C is energized, the movable element 22 is attracted toward the coil 21, the opening and closing portion 25 is separated from the contact portion 82a of the second component 70, and the second opening 82 is opened. That is, the fluid is allowed to flow from the first flow path 15a to the third flow path 15c through the second opening 82, and the fluid is allowed to flow out from the second outflow portion 12b.

As described above, a specification of an electromagnetic valve can be easily changed from a method of switching between two flow paths to a method of switching ON/OFF of fluid supply to one flow path only by changing the first component 50 in the electromagnetic valve 1A according to the first embodiment. The electromagnetic valve 1C is configured as a normally closed electromagnetic valve. Further, components other than the first component 50 in the electromagnetic valve 1A according to the first embodiment can be used as they are. Further, the operations and effects described in the first embodiment are similarly exhibited in the third embodiment as long as the operations and effects do not contradict with those of the electromagnetic valve 1C.

Fourth Embodiment

Figure 15:
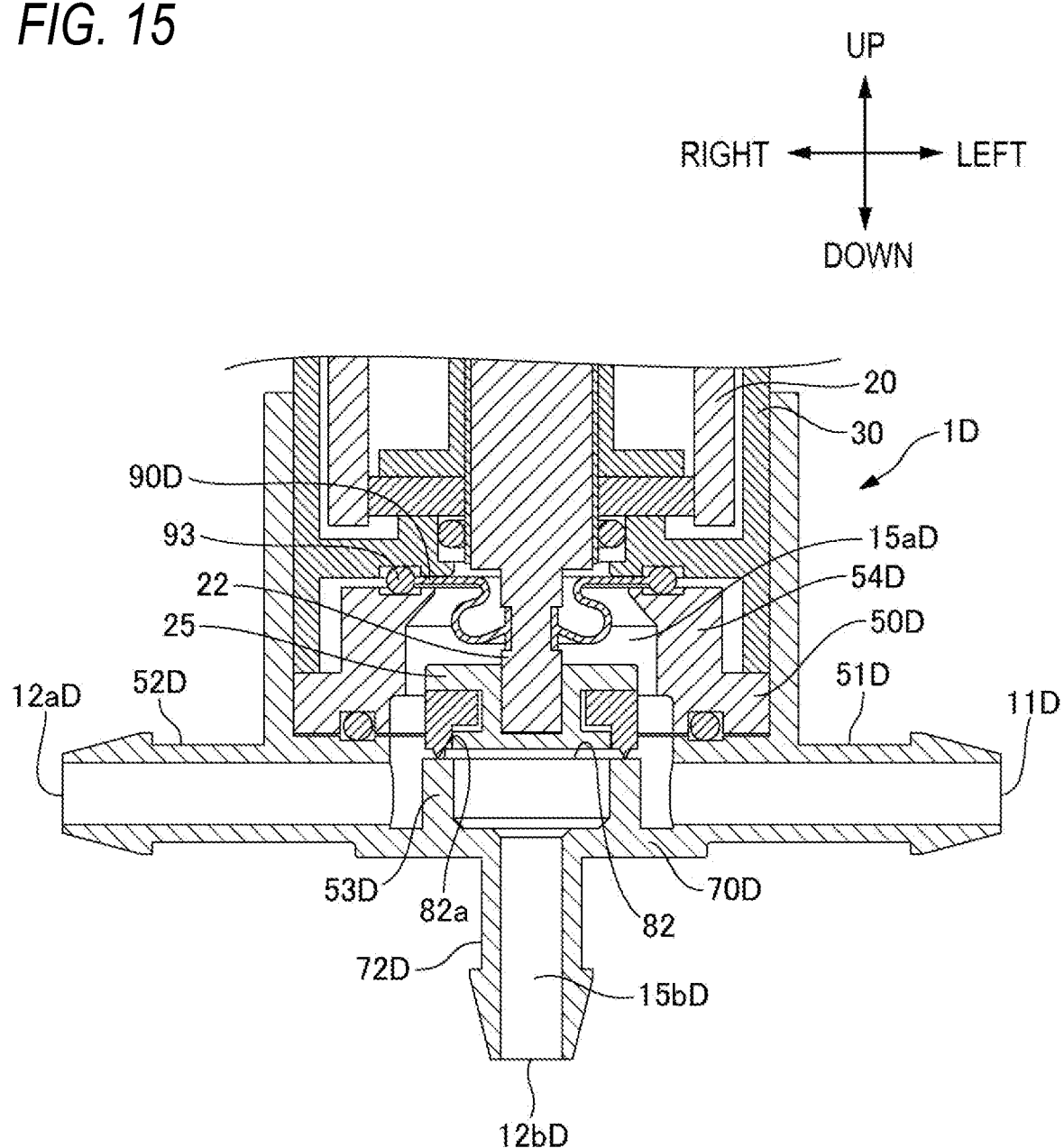
FIG. 15 is a partial cross-sectional view of an electromagnetic valve according to a fourth embodiment.

Next, a configuration of an electromagnetic valve 1D according to a fourth embodiment will be described with reference to FIG. 15. FIG. 15 is a partial cross-sectional view of the electromagnetic valve 1D. The electromagnetic valve 1D is different from the electromagnetic valve 1A according to the first embodiment in the first component 50 and the second component 70. Further, the seal portion 90 and the solenoid housing 30 are also slightly different. In the following description, a first component 50D and a second component 70D different from those of the electromagnetic valve 1A will be mainly described, and a description of common portions will be appropriately omitted.

The first component 50D of the electromagnetic valve 1D is not provided with the inflow portion 11, the first outflow portion 12a, the first connection portion 51, and the second connection portion 52 of the electromagnetic valve 1A. The first component 50D includes an enclosure portion 54D that defines a part of an outer edge of the flow path 15D inside the first component 50D. The second component 70D includes an inflow portion 11D, a first outflow portion 12aD, a second outflow portion 12bD, a first connection portion 51D connected to the inflow portion 11D, a second connection portion 52D connected to the first outflow portion 12aD, and a third connection portion 72D connected to the second outflow portion 12bD. The second component 70D is provided with the second opening 82 bordered by the contact portion 82a that can come into contact with the opening and closing portion 25 of the movable element 22. The second component 70D is provided with a partition portion 53D that partitions an inner space and an outer space in the radial direction. The partition portion 53D is connected to the second opening 82. The inner space partitioned by the partition portion 53D is connected to the third connection portion 72D. The outer space partitioned by the partition portion 53D is connected to the first connection portion 51D and the second connection portion 52D.

A first flow path 15aD is formed by the outer space partitioned by the partition portion 53D of the second component 70D and a space surrounded by the enclosure portion 54D of the first component 50D and the seal portion 90D. The seal portion 90D has the same configuration as the seal portion 90 of the electromagnetic valve 1A except that the seal portion 90D does not include a portion outside the second fitting portion 93 in the radial direction. A second flow path 15bD is formed by the inner space of the partition portion 53D of the second component 70D and a space inside the second connection portion 52D. In a case in which the electromagnetic valve 1D is in a closed state when power is not supplied, the movable element 22 is pushed out by a biasing member, and the opening and closing portion 25 comes into contact with the contact portion 82a of the second component 70 to close the second opening 82. That is, in the closed state, flow of a fluid to the second flow path 15bD via the second opening 82 and outflow of the fluid from the second outflow portion 12bD are prevented. On the other hand, in a case in which the electromagnetic valve 1D is in an open state when the power is supplied, the movable element 22 is attracted toward the coil 21, the opening and closing portion 25 is separated from the contact portion 82a of the second component 70D, and the second opening 82 is opened. That is, the fluid is allowed to flow from the first flow path 15aD to the second flow path 15bD through the second opening 82, and the fluid is allowed to flow out from the second outflow portion 12bD. In the electromagnetic valve 1D, the fluid is allowed to flow to the first outflow portion 12aD.

As described above, a specification of an electromagnetic valve can be changed from a method of switching between two flow paths to a method of switching circulation to one flow path by changing the first component 50 and the second component 70 while using common components such as the solenoid 20 and the solenoid housing 30 of the electromagnetic valve 1A in the electromagnetic valve 1D. Further, the operations and effects described in the first embodiment are similarly exhibited in the fourth embodiment as long as the operations and effects do not contradict with those of the electromagnetic valve 1D.

(Connection Example of Electromagnetic Valve)

Figure 16:
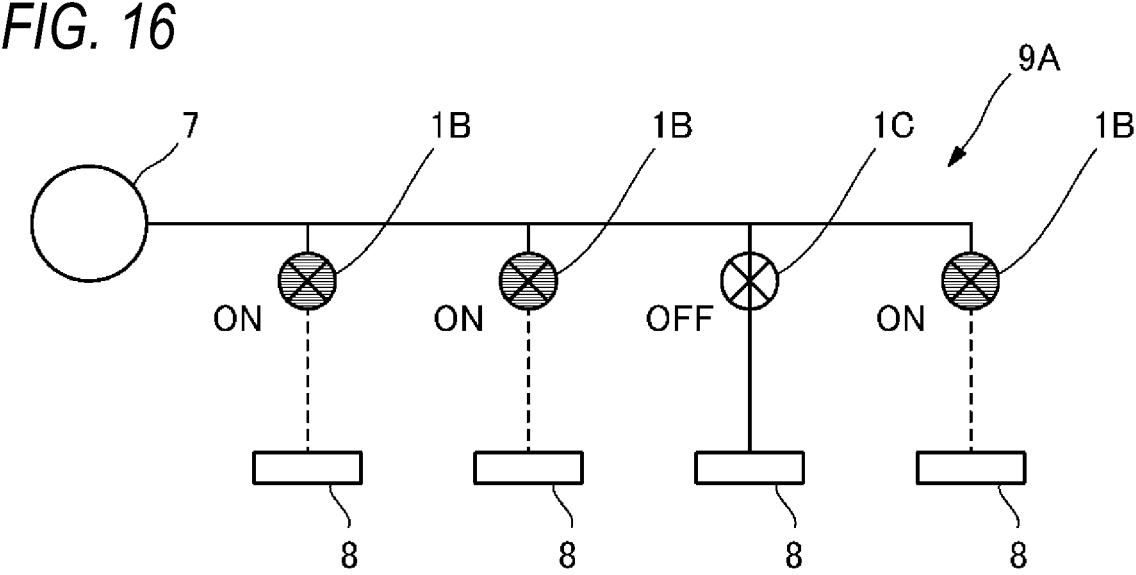
FIG. 16 is a schematic view showing a first connection example of an electromagnetic valve according to an embodiment.
Figure 17:
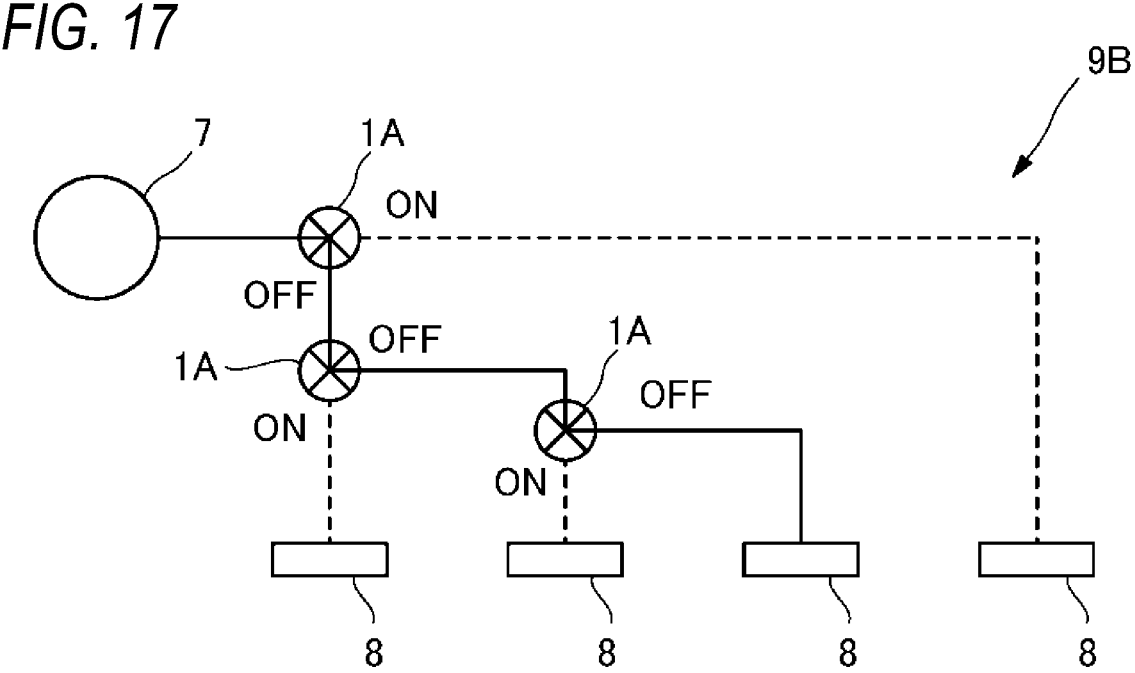
FIG. 17 is a schematic view showing a second connection example of an electromagnetic valve according to the embodiment.
Figure 18:
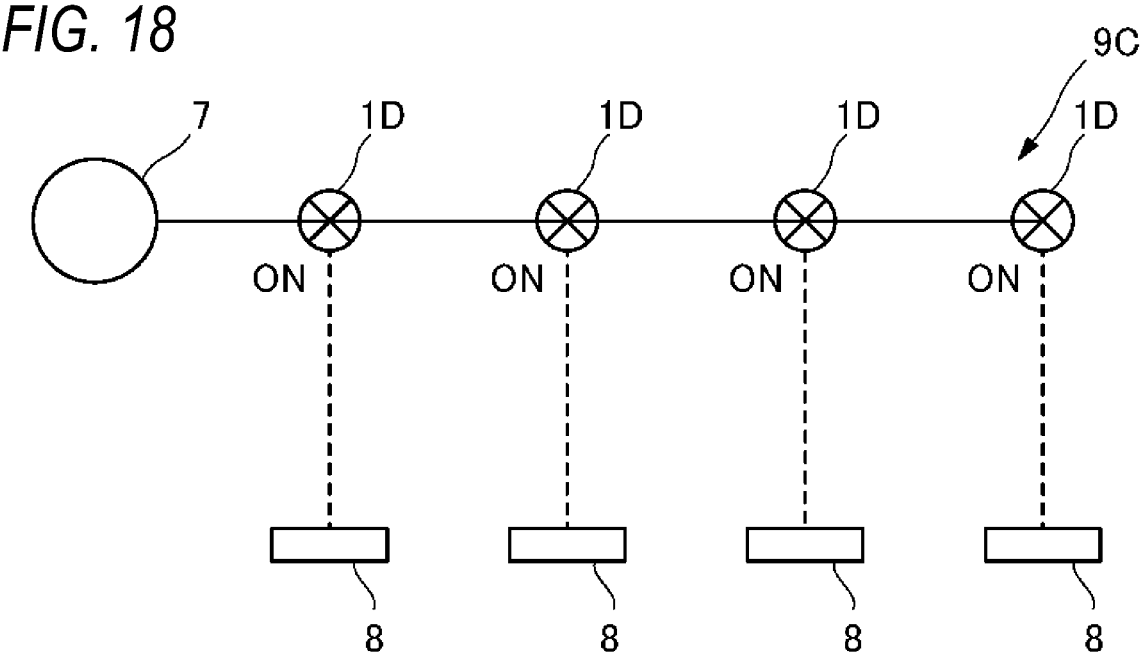
FIG. 18 is a schematic view showing a third connection example of an electromagnetic valve according to the embodiment.

Next, connection examples of the electromagnetic valve described in the embodiment will be described with reference to FIGS. 16 to 18. FIG. 16 is a view showing a first connection example of the electromagnetic valve. FIG. 17 is a view showing a second connection example of the electromagnetic valve. FIG. 18 is a view showing a third connection example of the electromagnetic valve.

FIG. 16 shows a cleaner system 9A including a tank 7, a plurality of cleaner units 8, and the electromagnetic valves 1B and 1C. A system can be constructed by combining the normally open electromagnetic valve 1B and the normally closed electromagnetic valve 1C according to a cleaning target and a priority of the cleaner unit 8, and expandability of the electromagnetic valves 1B and 1C in constructing the system is high.

FIG. 17 shows a cleaner system 9B including the tank 7, the plurality of cleaner units 8, and a plurality of the electromagnetic valves 1A. A small number of the electromagnetic valves 1A capable of switching between the two flow paths can switch fluid supply to the plurality of cleaner units 8. Further, the normally open flow path and the normally closed flow path can be selected according to the cleaning target and the priority of the cleaner unit 8, and the expandability in constructing the system is high.

FIG. 18 shows a cleaner system 9C including the tank 7, the plurality of cleaner units 8, and a plurality of the electromagnetic valves 1D. The cleaner system 9C can also be constructed by disposing, at a branch point of the flow path, the electromagnetic valve 1D capable of switching the flow of the fluid to one flow path while allowing the flow of the fluid to another flow path.

Although the embodiments of the present invention have been described above, it goes without saying that the technical scope of the present invention should not be limited to the description of the present embodiments. It should be understood by those skilled in the art that the present embodiment is merely an example, and that various modifications are possible within the scope of the invention described in the claims. The technical scope of the present invention should be determined based on the scope of the invention described in the claims and the equivalent scope thereof.

Although the electromagnetic valve including the first component having a rectangular shape when viewed from a bottom surface side has been described in the above embodiment, the electromagnetic valve may have another shape as long as the functions and effects are not inconsistent. For example, a polygonal shape other than the rectangular shape or a shape in which a part of surfaces are rounded may be used.

In the embodiments described above, the aspect in which the flow path forming portion includes the first component and the second component has been described, but the flow path forming portion may include one component as long as the functions and effects are not inconsistent. Further, in the first embodiment and the fourth embodiment, the configuration including two outflow portions has been described, but the configuration including one outflow portion as shown in the second embodiment and the third embodiment may be used.

In the above embodiment, the aspect in which the second component includes the first lock portion extending in the axial direction to the position where the second lock portion of the solenoid housing is provided has been described, but an opposite aspect may be adopted as long as the operations and effects are not inconsistent. For example, the second component may be provided with the first lock portion protruding in the radial direction, and the solenoid housing may be provided with the second lock portion that extends in the axial direction to a position where the first lock portion of the second component is provided and is locked to the first lock portion.

In the above embodiment, a specific aspect of the seal portion has been described, but it is possible to change the seal portion as appropriate within a range that does not contradict the operations and effects. For example, the O-ring or the like may be adopted instead of the above-described seal portion including the bent portion. Further, for example, the sheet portion and the third fitting portion may be omitted, and the seal portion may include the first fitting portion, the bent portion, and the second fitting portion.

In the above embodiment, the aspect in which the communication passage of the solenoid housing opens on the surface facing the flow path forming portion has been described, but the communication passage may open to the other surface as long as the operations and effects are not inconsistent. Further, the communication passage may not be provided as long as the operations and effects are not inconsistent.

The present application is based on Japan patent application (Japanese Patent Application No. 2021-009604, Japanese Patent Application No. 2021-009605, Japanese Patent Application No. 2021-009606, Japanese Patent Application No. 2021-009607, and Japanese Patent Application No. 2021-009608) filed on Jan. 25, 2021, and the contents of which are incorporated herein by reference. Further, the contents thereof are incorporated in their entirety herein by reference.

REFERENCE SIGNS LIST 1A, 1B, 1C, 1D: electromagnetic valve
2: sealing member
5: O-ring
5a: pressing portion
7: tank
8: cleaner unit
9A, 9B, 9C: cleaner system
10: flow path forming portion
11, 11D: inflow portion
12a, 12aD: first outflow portion
12b, 12bD: second outflow portion
15, 15D: flow path
15a, 15aD: first flow path
15b, 15bD: second flow path
15c: third flow path
18: first movement restriction portion
19: second movement restriction portion
20: solenoid
21: coil
22: movable element
23: guided portion
24: groove portion
25: opening and closing portion
26: guide portion
28: biasing member
30: solenoid housing
31: second lock portion
32: opening
35: first protrusion
35a: first abutting surface
35b: first inclined surface
39a: second abutting surface
39b: second inclined surface
40: communication passage
50, 50C, 50D: first component
50a: upper opening
50b: lower opening
501: inner space
500: outer space
51, 51D: first connection portion
52, 52D: second connection portion
53, 53D: partition portion
53a, 54a: flow hole
54, 54D: enclosure portion
55: first side surface
56: second side surface
59: second protrusion
59a: second abutting surface
59b: second inclined surface
62: first opening
62a: contact portion
65: side
65a: first end portion
65b: second end portion
67: space
70, 70B, 70B: second component
71: first lock portion
71a: first lock portion
71b: first lock portion
72, 72D: third connection portion
74: enclosure portion
75: first accommodating portion
75a: first abutted surface
79: second accommodating portion
79a: second abutted surface
82: second opening
82a: contact portion
85: ventilation portion
90, 90D: seal portion
90a: pressing portion
91: first fitting portion
91a: flat portion
92: bent portion
93: second fitting portion 94: sheet portion
95: third fitting portion
96: through hole
97: liquid storing portion
A: movement axis

The invention claimed is:

1. An electromagnetic valve comprising: a flow path forming portion including an inflow portion configured to allow a fluid to enter the flow path forming portion and an outflow portion configured to allow the fluid to flow out of the flow path forming portion to an outside, in which the fluid flows; a solenoid including a coil and a movable element capable of reciprocating in an axial direction with respect to the coil; and a solenoid housing accommodating at least the coil, wherein the electromagnetic valve is configured to switch between, by reciprocation of the movable element, a closed state in which the fluid is prevented from flowing out of the outflow portion and an open state in which the fluid is allowed to flow out of the outflow portion, the flow path forming portion includes a first component and a second component, the solenoid housing, the first component, and the second component are arranged in this order in the axial direction, the first component is provided with first and second connection portions that allow the fluid to flow between the flow path forming portion and an outside, a plurality of supporting portions, each supporting portion includes a first lock portion extending in the axial direction and a second lock portion engaging with the first lock portion to prevent mutual displacement of the solenoid housing and the second component in the axial direction, and each supporting portion of the plurality of supporting portions locking the solenoid housing to the second component with the first component interposed therebetween; and opposing side surfaces of the first component each includes a first end portion and a second end portion opposite the first end portion with respect to a direction perpendicular to the axial direction, a cross section of each opposing side surfaces passes through the respective first and second connection portion, the each first lock portion extending along the respective opposing side surfaces is located at the first end portion of the respective opposing side surfaces of the first component, and a space through which the respective first or second connection portion passes is provided from the first lock portion to the second end portion; wherein the first component has a rectangular shape when viewed from the axial direction, the respective first or second connection portion is provided on each of the opposing side surfaces of the first component, and the first lock portion is extending along each of the opposing side surfaces of the first component.

2. The electromagnetic valve according to claim 1, wherein
the first lock portions comprise a pair of first lock portions that are disposed at positions facing each other along a direction in which a diagonal line of the first component extends when viewed from the axial direction.

3. The electromagnetic valve according to claim 1, wherein
the space provided from the first lock portion to the second end portion side is open toward the solenoid housing.

4. The electromagnetic valve according to claim 1, wherein the first connection portion is connected to the inflow portion and the second connection portion is connected to the outflow portion.

5. An electromagnetic valve comprising:
a flow path forming portion including an inflow portion configured to allow a fluid to enter the flow path forming portion and first and second outflow portions configured to allow the fluid to flow out of the flow path forming portion to an outside;
a solenoid including a coil and a movable element capable of reciprocating in an axial direction with respect to the coil; and
a solenoid housing accommodating at least the coil, wherein
the electromagnetic valve is configured to switch between, by reciprocation of the movable element, a closed state in which the fluid is prevented from flowing out of the first outflow portion and an open state in which the fluid is allowed to flow out of the first outflow portion,
the flow path forming portion includes a first component and a second component, and
the first component and the second component form a flow path,
an opening and closing portion is provided at an end of the movable element,
the first component is provided with the inflow portion, the first outflow portion, and a first opening bordered by a contact portion capable of contacting with the opening and closing portion,
the second component is provided with the second outflow portion and a second opening bordered by a contact portion capable of contacting with the opening and closing portion, and
the opening and closing portion is located between the first opening and the second opening.

6. The electromagnetic valve according to claim 5, wherein
the solenoid housing and the second component are provided with supporting portions supporting each other, and
the solenoid housing and the second component support each other with the first component interposed therebetween, by the supporting portions.

7. The electromagnetic valve according to claim 6, wherein
the supporting portion of the solenoid housing includes a protrusion,
the supporting portion of the second component includes an accommodating portion capable of accommodating the protrusion, and
the solenoid housing and the second component support each other by accommodating the protrusion in the accommodating portion.

8. An electromagnetic valve comprising:
a flow path forming portion including an inflow portion configured to allow a fluid to enter the flow path forming portion and an outflow portion configured to allow the fluid to flow out of the flow path forming portion to an outside;
a solenoid including a coil and a movable element capable of reciprocating in an axial direction with respect to the coil; and
a solenoid housing accommodating at least the coil, wherein
the electromagnetic valve is configured to switch between, by reciprocation of the movable element, a closed state in which the fluid is prevented from flowing out of the outflow portion and an open state in which the fluid is allowed to flow out of the outflow portion, the flow path forming portion includes a first component and a second component, the solenoid housing, the first component, and the second component are arranged in this order in the axial direction, an elastic member is provided between the solenoid housing and the first component, the solenoid housing and the second component are respectively provided with first movement restriction portions that restrict relative movement of the first component in the axial direction relative to the solenoid housing in a direction away from each other, and the first component and the second component are respectively provided with second movement restriction portions that restrict relative movement in a direction away from each other, the second movement restriction portion of the first component includes a second protrusion including a second abutting surface and a second inclined surface, the second movement restriction portion of the second component includes a second abutted surface abutting against the second abutting surface, and a second accommodating portion capable of accommodating the second protrusion, and the second abutted surface, the second abutting surface, and the second inclined surface are arranged in this order in the axial direction.

9. The electromagnetic valve according to claim 8, wherein the elastic member prevents the fluid from flowing from the flow path forming portion to the coil, and a pressing portion configured to press the elastic member in the axial direction is provided between the solenoid housing and the first component.

10. The electromagnetic valve according to claim 8, wherein an O-ring is provided between the first component and the second component.

11. The electromagnetic valve according to claim 8, wherein the first movement restriction portions and the second movement restriction portions are not arranged on the same straight line in the axial direction.

12. The electromagnetic valve according to claim 8, wherein the first movement restriction portion of the solenoid housing includes a first protrusion including a first abutting surface and a first inclined surface, the first movement restriction portion of the second component includes a first abutted surface abutting against the first abutting surface, and a first accommodating portion capable of accommodating the first protrusion, and the first abutted surface, the first abutting surface, and the first inclined surface are arranged in this order in the axial direction.

* * * * *